United States Patent
Sakuyama

(10) Patent No.: US 7,697,767 B2
(45) Date of Patent: Apr. 13, 2010

(54) CODE PROCESSING DEVICE, CODE PROCESSING METHOD, PROGRAM, AND RECORDING MEDIUM

(75) Inventor: Hiroyuki Sakuyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1113 days.

(21) Appl. No.: 11/331,369

(22) Filed: Jan. 11, 2006

(65) Prior Publication Data

US 2006/0152391 A1 Jul. 13, 2006

(30) Foreign Application Priority Data

Jan. 11, 2005 (JP) .............................. 2005-003710

(51) Int. Cl.
*G06K 9/36* (2006.01)
(52) U.S. Cl. ...................... 382/232; 348/394.1; 341/50
(58) Field of Classification Search ................. 382/100, 382/224, 232, 234, 235, 236, 237, 238, 239, 382/242, 245, 246, 247, 248; 348/394.1–701.1; 358/426.02–426.11; 341/50–77
See application file for complete search history.

(56) References Cited

U.S. PATENT DOCUMENTS

| | | | |
|---|---|---|---|
| 2004/0213466 A1* | 10/2004 | Kodama et al. | 382/232 |
| 2004/0213472 A1* | 10/2004 | Kodama et al. | 382/239 |
| 2005/0091051 A1* | 4/2005 | Moriya et al. | 704/229 |
| 2006/0152391 A1* | 7/2006 | Sakuyama | 341/51 |
| 2009/0049361 A1* | 2/2009 | Koren et al. | 714/755 |
| 2009/0052736 A1* | 2/2009 | Kacker | 382/100 |

FOREIGN PATENT DOCUMENTS

| | | |
|---|---|---|
| JP | 11-205786 | 7/1999 |
| JP | 2001-298366 | 10/2001 |
| JP | 2003-023630 | 1/2003 |
| JP | 2004112760 | 4/2004 |
| JP | 2004208266 | 7/2004 |
| JP | 2004289333 | 10/2004 |

OTHER PUBLICATIONS

Japanese Patent Application for corresponding Japanese Patent Application No. JP2005-003710, Dec. 2, 2009, 2 pgs. *No English Translation Provided*.

* cited by examiner

*Primary Examiner*—Anand Bhatnagar
(74) *Attorney, Agent, or Firm*—Blakely, Sokoloff, Taylor & Zafman LLP

(57) ABSTRACT

In a code processing device, a rank assignment unit assigns ranks to sets of partial codes of original codes respectively, wherein, when the sets have different quality levels, a high rank is assigned to a set of partial codes having a low quality level, and when the sets have a same quality level and different resolution levels, a high rank is assigned to a set of partial codes having a low resolution level. A partial code selecting unit selecting sets of partial codes that have a quality specified by a specified quality value and are included in output codes, in order of the assigned ranks. A code forming unit forms the output codes in which the sets of selected partial codes are included.

6 Claims, 27 Drawing Sheets

LRCP

| | PACKET 0 | PACKET 1 | PACKET 2 | PACKET 3 | PACKET 4 | PACKET 5 |
|---|---|---|---|---|---|---|
| | LAYER 0 | LAYER 0 | LAYER 0 | LAYER 0 | LAYER 0 | LAYER 0 |
| | RE. LVL 0 | RE. LVL 0 | RE. LVL 0 | RE. LVL 1 | RE. LVL 1 | RE. LVL 1 |
| | COMPO. 0 | COMPO. 1 | COMPO. 2 | COMPO. 0 | COMPO. 1 | COMPO. 2 |
| | PRECIN. 0 | PRECIN. 0 | PRECIN. 0 | PRECIN. 0 | PRECIN. 0 | PRECIN. 0 |

| | PACKET 6 | PACKET 7 | PACKET 8 | PACKET 9 | PACKET 10 | PACKET 11 |
|---|---|---|---|---|---|---|
| | LAYER 0 | LAYER 0 | LAYER 0 | LAYER 0 | LAYER 0 | LAYER 0 |
| | RE. LVL 2 | RE. LVL 2 | RE. LVL 2 | RE. LVL 2 | RE. LVL 2 | RE. LVL 2 |
| | COMPO. 0 | COMPO. 0 | COMPO. 0 | COMPO. 0 | COMPO. 1 | COMPO. 1 |
| | PRECIN. 0 | PRECIN. 1 | PRECIN. 2 | PRECIN. 3 | PRECIN. 0 | PRECIN. 1 |

| | PACKET 12 | PACKET 13 | PACKET 14 | PACKET 15 | PACKET 16 | PACKET 17 |
|---|---|---|---|---|---|---|
| | LAYER 0 | LAYER 0 | LAYER 0 | LAYER 0 | LAYER 0 | LAYER 0 |
| | RE. LVL 2 | RE. LVL 2 | RE. LVL 2 | RE. LVL 2 | RE. LVL 2 | RE. LVL 2 |
| | COMPO. 1 | COMPO. 1 | COMPO. 2 | COMPO. 2 | COMPO. 2 | COMPO. 2 |
| | PRECIN. 2 | PRECIN. 3 | PRECIN. 0 | PRECIN. 1 | PRECIN. 2 | PRECIN. 3 |

| | PACKET 18 | PACKET 19 | PACKET 20 | PACKET 21 | PACKET 22 | PACKET 23 |
|---|---|---|---|---|---|---|
| | LAYER 1 | LAYER 1 | LAYER 1 | LAYER 1 | LAYER 1 | LAYER 1 |
| | RE. LVL 0 | RE. LVL 0 | RE. LVL 0 | RE. LVL 1 | RE. LVL 1 | RE. LVL 1 |
| | COMPO. 0 | COMPO. 1 | COMPO. 2 | COMPO. 0 | COMPO. 1 | COMPO. 2 |
| | PRECIN. 0 | PRECIN. 0 | PRECIN. 0 | PRECIN. 0 | PRECIN. 0 | PRECIN. 0 |

| | PACKET 24 | PACKET 25 | PACKET 26 | PACKET 27 | PACKET 28 | PACKET 29 |
|---|---|---|---|---|---|---|
| | LAYER 1 | LAYER 1 | LAYER 1 | LAYER 1 | LAYER 1 | LAYER 1 |
| | RE. LVL 2 | RE. LVL 2 | RE. LVL 2 | RE. LVL 2 | RE. LVL 2 | RE. LVL 2 |
| | COMPO. 0 | COMPO. 0 | COMPO. 0 | COMPO. 0 | COMPO. 1 | COMPO. 1 |
| | PRECIN. 0 | PRECIN. 1 | PRECIN. 2 | PRECIN. 3 | PRECIN. 0 | PRECIN. 1 |

| | PACKET 30 | PACKET 31 | PACKET 32 | PACKET 33 | PACKET 34 | PACKET 35 |
|---|---|---|---|---|---|---|
| | LAYER 1 | LAYER 1 | LAYER 1 | LAYER 1 | LAYER 1 | LAYER 1 |
| | RE. LVL 2 | RE. LVL 2 | RE. LVL 2 | RE. LVL 2 | RE. LVL 2 | RE. LVL 2 |
| | COMPO. 1 | COMPO. 1 | COMPO. 2 | COMPO. 2 | COMPO. 2 | COMPO. 2 |
| | PRECIN. 2 | PRECIN. 3 | PRECIN. 1 | PRECIN. 2 | PRECIN. 3 | PRECIN. 4 |

FIG.12

VIEWING DISTANCE 1000

| Y | DECOMPOSITION LEVEL ||
|---|---|---|
|   | LEVEL 2 | LEVEL 1 |
| LL | 1.0 |  |
| HL | 0.998 | 0.8 |
| LH | 0.998 | 0.8 |
| HH | 0.997 | 0.6 |

| Y | DECOMPOSITION LEVEL ||
|---|---|---|
|   | LEVEL 2 | LEVEL 1 |
| LL | 1 |  |
| HL |  |  |
| LH | 4 | 5 |
| HH |  |  |

| Cb | DECOMPOSITION LEVEL ||
|---|---|---|
|   | LEVEL 2 | LEVEL 1 |
| LL | 1.0 |  |
| HL | 0.5 | 0.2 |
| LH | 0.5 | 0.2 |
| HH | 0.3 | 0.1 |

| Cb | DECOMPOSITION LEVEL ||
|---|---|---|
|   | LEVEL 2 | LEVEL 1 |
| LL | 3 |  |
| HL |  |  |
| LH | 7 | 9 |
| HH |  |  |

| Cr | DECOMPOSITION LEVEL ||
|---|---|---|
|   | LEVEL 2 | LEVEL 1 |
| LL | 1.0 |  |
| HL | 0.6 | 0.3 |
| LH | 0.6 | 0.3 |
| HH | 0.4 | 0.2 |

| Cr | DECOMPOSITION LEVEL ||
|---|---|---|
|   | LEVEL 2 | LEVEL 1 |
| LL | 2 |  |
| HL |  |  |
| LH | 6 | 8 |
| HH |  |  |

VISUAL WEIGHT (1000)　　　　　RANKING OF PACKETS

FIG.13

VIEWING DISTANCE 1700

| Y | DECOMPOSITION LEVEL | |
|---|---|---|
| | LEVEL 2 | LEVEL 1 |
| LL | 1.0 | |
| HL | 0.9 | 0.3 |
| LH | 0.9 | 0.3 |
| HH | 0.7 | 0.1 |

| Y | DECOMPOSITION LEVEL | |
|---|---|---|
| | LEVEL 2 | LEVEL 1 |
| LL | 1 | |
| HL | | |
| LH | 4 | 7 |
| HH | | |

| Cb | DECOMPOSITION LEVEL | |
|---|---|---|
| | LEVEL 2 | LEVEL 1 |
| LL | 1.0 | |
| HL | 0.3 | 0.1 |
| LH | 0.3 | 0.1 |
| HH | 0.2 | 0.0 |

| Cb | DECOMPOSITION LEVEL | |
|---|---|---|
| | LEVEL 2 | LEVEL 1 |
| LL | 3 | |
| HL | | |
| LH | 6 | 9 |
| HH | | |

| Cr | DECOMPOSITION LEVEL | |
|---|---|---|
| | LEVEL 2 | LEVEL 1 |
| LL | 1.0 | |
| HL | 0.4 | 0.2 |
| LH | 0.4 | 0.2 |
| HH | 0.2 | 0.1 |

| Cr | DECOMPOSITION LEVEL | |
|---|---|---|
| | LEVEL 2 | LEVEL 1 |
| LL | 2 | |
| HL | | |
| LH | 5 | 8 |
| HH | | |

VISUAL WEIGHT (1700)            RANKING OF PACKETS

FIG.14

VIEWING DISTANCE 3000

| Y | DECOMPOSITION LEVEL | |
|---|---|---|
| | LEVEL 2 | LEVEL 1 |
| LL | 1.0 | |
| HL | 0.41 | 0.04 |
| LH | 0.41 | 0.04 |
| HH | 0.18 | 0.00 |

| Y | DECOMPOSITION LEVEL | |
|---|---|---|
| | LEVEL 2 | LEVEL 1 |
| LL | 1 | |
| HL | 4 | 7 |
| LH | | |
| HH | | |

| Cb | DECOMPOSITION LEVEL | |
|---|---|---|
| | LEVEL 2 | LEVEL 1 |
| LL | 1.0 | |
| HL | 0.12 | 0.02 |
| LH | 0.12 | 0.02 |
| HH | 0.04 | 0.003 |

| Cb | DECOMPOSITION LEVEL | |
|---|---|---|
| | LEVEL 2 | LEVEL 1 |
| LL | 3 | |
| HL | 6 | 9 |
| LH | | |
| HH | | |

| Cr | DECOMPOSITION LEVEL | |
|---|---|---|
| | LEVEL 2 | LEVEL 1 |
| LL | 1.0 | |
| HL | 0.21 | 0.06 |
| LH | 0.21 | 0.06 |
| HH | 0.10 | 0.01 |

| Cr | DECOMPOSITION LEVEL | |
|---|---|---|
| | LEVEL 2 | LEVEL 1 |
| LL | 2 | |
| HL | 5 | 8 |
| LH | | |
| HH | | |

VISUAL WEIGHT (3000)　　　　RANKING OF PACKETS

FIG.15

| QUALITY | PACKETS TO BE SELECTED |
|---|---|
| 0 ~ 10 | RANK 1 |
| 11 ~ 21 | RANKS 1 ~ 2 |
| 22 ~ 32 | RANKS 1 ~ 3 |
| 33 ~ 43 | RANKS 1 ~ 4 |
| 44 ~ 54 | RANKS 1 ~ 5 |
| 55 ~ 65 | RANKS 1 ~ 6 |
| 66 ~ 76 | RANKS 1 ~ 7 |
| 77 ~ 87 | RANKS 1 ~ 8 |
| 88 ~ 100 | RANKS 1 ~ 9 |

FIG.19

| QUALITY VALUE | VISUAL WEIGHT SELECTED |
|---|---|
| 0 ~ 34 | VISUAL WEIGHT (3000) |
| 35 ~ 69 | VISUAL WEIGHT (1700) |
| 70 ~ 100 | VISUAL WEIGHT (1000) |

FIG.20

| QUALITY VALUE | COMPRESSION RATIO | | |
|---|---|---|---|
| | UNDER 20 | OVER 20, UNDER 40 | OVER 40 |
| 0 ~ 34 | VISUAL WEIGHT (3000) | VISUAL WEIGHT (3000) | VISUAL WEIGHT (3000) |
| 35 ~ 69 | VISUAL WEIGHT (1700) | VISUAL WEIGHT (1700) | VISUAL WEIGHT (1700) |
| 70 ~ 100 | VISUAL WEIGHT (1000) | VISUAL WEIGHT (1000) | VISUAL WEIGHT (1700) |

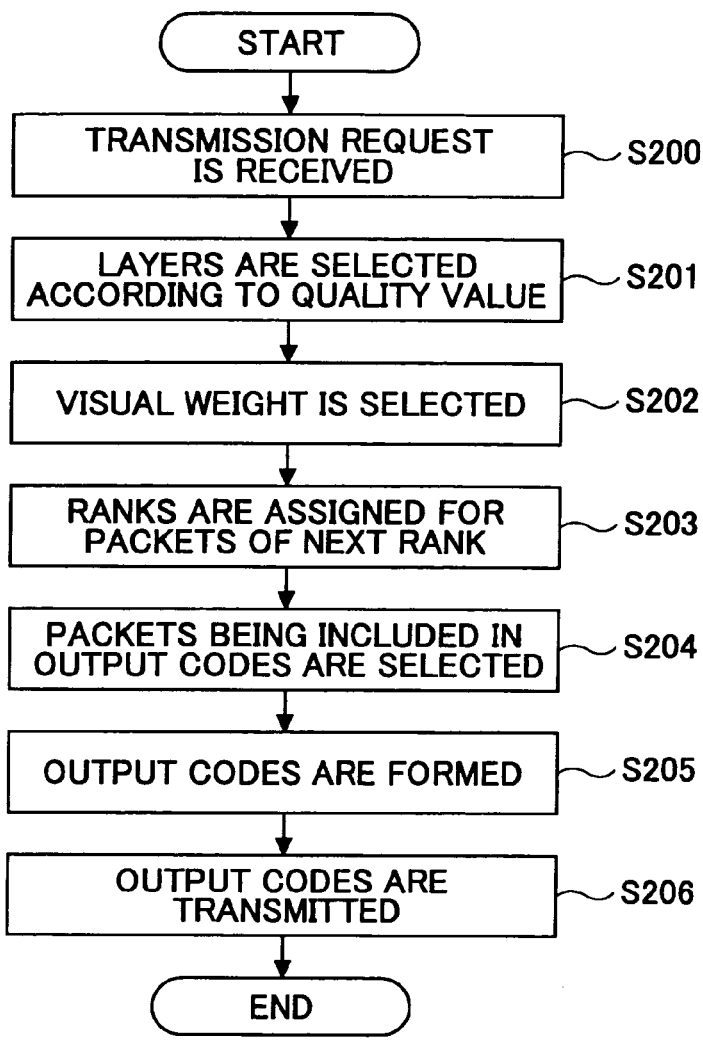

FIG.23

| QUALITY_REST VALUE | PACKETS SELECTED |
|---|---|
| 1 ~ 3 | RANK 1 |
| 4 ~ 6 | RANKS 1 ~ 2 |
| 7 ~ 9 | RANKS 1 ~ 3 |
| 10 ~ 12 | RANKS 1 ~ 4 |
| 13 ~ 15 | RANKS 1 ~ 5 |
| 16 ~ 18 | RANKS 1 ~ 6 |
| 19 ~ 20 | RANKS 1 ~ 7 |
| 21 ~ 22 | RANKS 1 ~ 8 |
| 23 ~ 24 | RANKS 1 ~ 9 |

QUALITY_REST = QUALITY − INT (QUALITY/25)*25

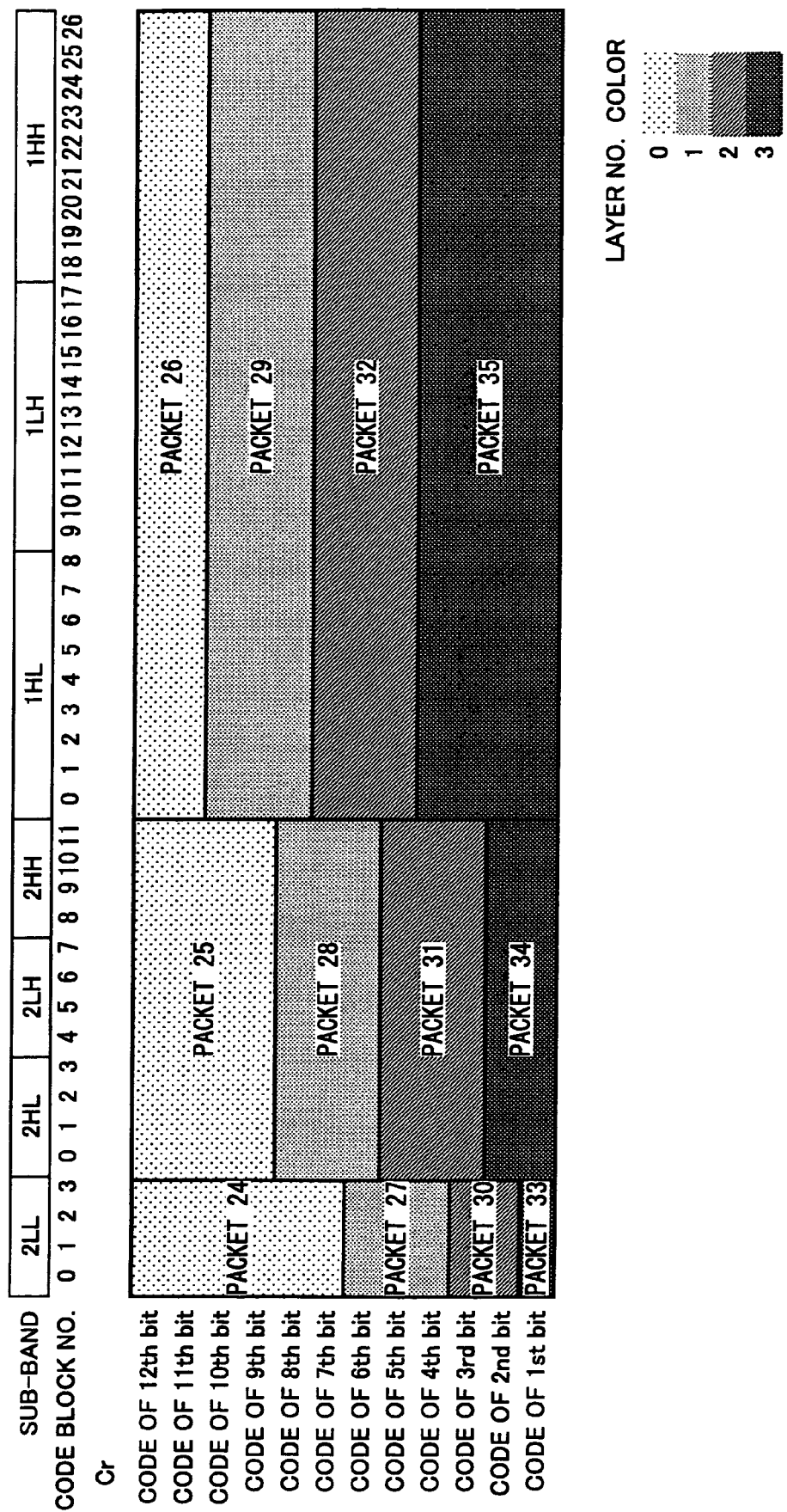

CODE PROCESSING DEVICE, CODE PROCESSING METHOD, PROGRAM, AND RECORDING MEDIUM

The present application claims priority to and incorporates by reference the entire contents of Japanese priority document 2005-003710, filed in Japan on Jan. 11, 2005.

BACKGROUND OF THE INVENTION

1. Field of the Invention

The present invention relates to a code processing device and method which generates, from original codes of an image, output codes having a quality according to a specified quality value.

2. Description of the Related Art

In recent years, adoption of the wavelet transform is increasing as the frequency transform which replaces DCT (discrete cosine transformation) that is used in the JPEG (Joint Photographic Coding Experts Group) standard. A typical example is the image compression/decompression method JPEG2000 which became the international standard in 2001 as the follow on to the JPEG standard.

FIG. 1 shows a simplified algorithm of the coding processing of JPEG2000.

At step S1, each component of image data that is to be compressed and encoded is divided into rectangular tiles (the number of tiles ≧1), and color space conversion of each tile is carried out to generate components, such as brightness and color difference. Color space conversion from RGB data or CMY data into YCrCb data is performed on the tiles at step S1 in order to improve the compression ratio. However, this color space conversion may be omitted.

At step S2, each of the components after color space conversion (called a tile component) is divided into four sub-bands (which are called LL, HL, LH, and HH) by carrying out a wavelet transform.

Applying the wavelet transform (decomposition) is recursively repeated to the LL subband, and finally one LL subband and plural subbands HL, LH and HH will be generated.

In JPEG2000, the irreversible wavelet transform called the 9×7 transform and the reversible wavelet transform called the 5×3 transform are used. And the irreversible color transform ICT for the 9×7 transform and the reversible color transform RCT for the 5×3 transform are specified for the color space conversion.

At this step S2, two-dimensional wavelet transform (disperse wavelet transform DWT) is performed on each tile image of each component after the color space conversion.

The two-dimensional wavelet transform is performed on a tile image having the decomposition level of zero so that the tile image can be divided into sub-bands 1LL, 1HL, 1LH and 1HH. The two-dimensional wavelet transform is applied to coefficients of the sub-band 1LL so that the sub-band 1LL can be divided into sub-bands 2LL, 2HL, 2LH and 2HH. The two-dimensional wavelet transformation is applied to a coefficient of the sub-band 2LL so that the sub-band 2LL can be divided into sub-bands 3LL, 3HL, 3LH and 3HH.

At step S3, the wavelet coefficients obtained by such octave division of the low frequency component (coefficient of the sub-band LL) is quantized for each sub-band. In JPEG2000, it is possible to perform either lossless (reversible) compression or lossy (irreversible) compression. Further, in JPEG2000, in the case of the lossless compression, the quantizing step width is always "1" so that the quantizing is not performed.

After the quantizing is performed, the coefficient of each sub-band is entropy-encoded at step S4. For this entropy encoding, an encoding method called EBCOT (Embedded Block Coding with Optimized Truncation) is used that includes block division, coefficient modeling, and binary arithmetic encoding. In the entropy encoding, a bit-plane of the coefficient of each sub-band after the quantizing is encoded from an upper plane to a lower plane by the block called a code block.

The last two steps S5 and S6 are the code forming processes. At step S5, the codes created at step S4 are collected to form a packet. Next, at step S6, the packets created at step S5 are arranged in accordance with a progression order, and necessary tag information is added to the arranged packets in order to form encoded data in a predetermined format. In JPEG2000, five types of progression orders based on combination of a resolution level, a position, a layer, and a component (color component) are defined for encoding order control.

According to the JPEG2000 algorithm, image quality is good at a high compression rate (or a low bit rate). Such a JPEG2000 algorithm has many characteristics.

As one characteristic of the JPEG2000 algorithm, it is possible to adjust an entire code amount without performing recompression by performing post-quantization such that the code of the encoded data is truncated (truncated). This code truncation can be performed in various units such as a tile region, a component, a decomposition level (resolution level), a bit plane, a sub-bit plane, a packet, and a layer (in the case of multi-layers). The relation between the decomposition level and the resolution level is shown in FIG. 3. As for another characteristic of the JPEG algorithm, encoded data can be easily divided into two or more encoded data in the encoded state, and these encoded data can be combined to restore the original encoded data. As for still another characteristic of the JPEG2000 algorithm, by only rewriting (changing) tag information of encoded data, decoding can be performed as if a part of the code line is actually truncated.

Next, a precinct, a code block, a packet and a layer will be briefly described. There is the following size relation: image size≧tile size≧sub-band size≧precinct size≧code block size.

A precinct refers to a rectangular region of the sub-bands. As shown in FIG. 2, a set of three regions that are located at the spatially same positions of the sub-bands HL, LH and HH having the same decomposition level is treated as one precinct. However, as for the sub-band LL, one region is treated as one precinct. The size of the precinct can be made equal to the size of the sub-band. A code block is a rectangular region that is created by dividing the precinct. For simplicity, the precinct and one code block at the decomposition level 1 are shown in FIG. 3.

A packet is created by collecting partial codes of the all code blocks included in the precinct (for example, the codes of three bit planes from the first bit plane to the third bit plane). A packet having a vacant code can be allowed. Thus, the codes of the code blocks are collected to create packets, and the packets are arranged in accordance with a desired progression order to form encoded data.

By collecting the packets of the all precincts (i.e., all code blocks, all sub-bands), partial codes of the entire image region (for example, this part corresponds to the codes of the upper-most bit plane to the third bit plane of the wavelet coefficients of the entire image region) are created as a layer. However, as shown in the following example, the layer does not necessarily have to include the packets of all precincts. Accordingly, when a larger number of layers are decoded at the time of decompression, the image quality of the reproduced image is more improved. In other words, a layer can be considered as a unit of image quality. By collecting all layers, the codes of all bit planes of the entire image region are made.

FIG. 4 shows examples of packets and layers in a case where the decomposition level number is 2 (the resolution level number is 3). The upper example of FIG. 4 is the example of layers in the case where the decomposition level number is 2 and the precinct size equal the sub-band size. In the lower example of FIG. 4, some of the packets included in each layer are enclosed by the thick lines.

In the following, the operation to arrange packets in a sequence according to the partitions of the packets or layers being generated will be called code formation. A packet is composed of partial codes of the original codes of JPEG2000, and has the following four attributes: component attribute, resolution attribute, precinct attribute, and layer attribute. The arrangement of packets is equivalent to selecting the order according to any of the four attributes as the sequence in which the packets are arranged.

JPEG2000 has another characteristic in which a progression order of encoded data can be changed in the encoded state. In JPEG2000, five progression orders LRCP, RLCP, RPCL, PCRL and CPRL are defined where L denotes a layer, R denotes a resolution level, G denotes a component, and P denotes a precinct (position).

In a case of the LRCP progression, the packet arrangement order (at the time of encoding) or the packet interpretation order (at the time of decoding) is represented as the following for-loop nested in the order of L, R, C, P.

```
for ( layer ) {
    for (resolution) {
        for (component) {
            for (precinct) {
                arranging packets when encoding
                interpreting packet attributes when decoding
            }
        }
    }
}.
```

In a specific example, the image size is 100×100 pixels (without tile dividing), the number of layers is 2, the resolution level is 3 (levels 0 through 2), and the component number is 3, a precinct size is 32×32. In this example, 36 packets are arranged and interpreted in the manner shown in FIG. 7.

Also in cases of the other progression orders, a packet arranging order or a packet interpreting order can be determined by the nested for-loop.

Each packet has a packet header, and the following information is contained in a packet header:
  information as to whether the content of the packet is empty or not,
  information as to which code block is included in the packet,
  the number of zero bit planes of each code block included in the packet,
  the number of coding paths of codes of each code block contained in the packet (the number of bit planes),
  the code length of each code block included in the packet.

However, a packet header does not contain any attribute value, such as a layer number and a resolution level. At the time of decoding, the above-mentioned for-loop is formed based on the progression order indicated in the COD marker in the main header of the encoded data (codes). The partition of a packet is determined based on the sum of the code lengths of respective code blocks included in the packet. What specific resolution level and what specific layer each packet pertains can be recognized by detecting the position in the for-loop where each packet is handled.

This means that if the code lengths in the packet header of the current packet are read, the following packet can be detected without decoding the entropy codes themselves, i.e., arbitrary packets can be accessed.

FIG. 6 shows an example of the layer progressive codes in which layer is located in the outermost part of the for-loop as in the LRCP progression. In FIG. 6, SOC denotes the start of codestream, SOT denotes the start of tile-part, SOD denotes the start of data, and EOC denotes the end of codestream.

FIG. 7 shows an example of an array of 36 packets in the case of the LRCP progression in which the image size is 100×100 pixels, the number of layers is two, the number of resolution levels is 3 (0-2), the number of components is three, and the precinct size is 32×32.

As mentioned above, accessing the original codes of JPEG2000 per packet is possible, and this means that new codes can be generated by extracting from the original codes, necessary partial codes (i.e., packets). This also means that the original codes can be decoded partially if needed. For example, when an image of a large size from the server is displayed on the client side, it is possible that only partial codes with a desired quality, partial codes with a desired resolution, partial codes of a desired location, or partial codes with a desired component be received from the server and decoded on the client side.

Thus, the protocol JPIP (JPEG2000 Interactive Protocol) for receiving the necessary partial codes only from the original codes of JPEG2000 stored in the server is currently in the progress of standardization.

Japanese Laid-Open Patent Application No. 2003-023630 discloses the cache model in JPIP.

Similarly, the conventional protocols for hierarchical access of a partial image can be found in FlashPix (registered trademark) which is multiplex resolution expression of an image and can be found in the protocol IIP (Internet Imaging Protocol) for accessing the same. Japanese Laid-Open Patent Application No. 11-205786 discloses a background technology related to similar protocols for hierarchical access of a partial image.

In addition, according to JPEG2000, a visual weight is defined as an example of a visual frequency characteristic of each component, and three types of visual weight of observation distance for each component: 1000, 1700, and 3000 are described. Japanese Laid-Open Patent Application No. 2001-298366 discloses that selecting a visual weight according to a compression ratio or a quantization error of original codes allows formation of an image with good quality.

In the case of JPIP, specifying a desired area of an image for image drawing and a desired image quality from a client to a server is proposed. When the desired area is specified, the server transmits to the client the packets of precincts that cover the specified area in the image. Namely, when the desired area is specified, only the packets of necessary precincts can be transmitted by performing suitably the related part of the for-loop: for (precinct) {interpreting packet attributes when decoding}. Also, when the desired quality of image is specified simultaneously with the area, only the packets of necessary layers can be transmitted by performing suitably the related part of the for-loop: for (layer) { . . . for (precinct) {interpreting packet attributes when decoding} . . . }.

Currently, enabling the specification of a quality value in a range of 0 to 100 as a quality specification (quality request) is proposed. It can be assumed according to the proposal that, if the specified quality value is set to a large value, the number of layers of the partial codes is transmitted can be increased. For example, suppose that the original codes stored in the server comprise 50 layers, and if a specified quality value is 50, the partial codes for 25 layers can be transmitted. Namely, the related part of the for-loop: for (layer=0 to 24) { . . . } is carried out and the resulting packets can be transmitted. This is because a layer is a unit of quality of an image.

However, there may be a case in which the original codes in the server comprise one layer. It is uncertain as to which packets should be transmitted if a specified quality value is 50 in this case. There is only one quality unit for one layer.

Similarly, there may be a case in which the original codes in the server comprise three layers. If a specified quality value is 50 in this case, the packets of the highest rank layer should be transmitted. However, it is uncertain as to whether the packets of the second rank layer should be transmitted or not.

SUMMARY OF THE INVENTION

A code processing device, code processing method, program, and recording medium are described. In one embodiment, a code processing device which generates, from original codes having sets of partial codes with quality attributes and resolution attributes, output codes having a quality according to a specified quality value, the code processing device comprises a rank assignment unit to assign ranks to the sets of partial codes respectively, wherein, when the sets of partial codes have different quality levels, a high rank is assigned to a set of partial codes having a low quality level, and when the sets of partial codes have a same quality level and different resolution levels, a high rank is assigned to a set of partial codes having a low resolution level, a partial code selecting unit to select sets of partial codes from among the original codes, which have the quality according to the specified quality value and are included in the output codes, in order of the ranks assigned by the rank assignment unit, and a code forming unit to form the output codes in which the sets of partial codes selected by the partial code selecting unit are included.

BRIEF DESCRIPTION OF THE DRAWINGS

Other objects, features and advantages of the present invention will be apparent from the following detailed description when reading in conjunction with the accompanying drawings.

FIG. 4 is a diagram to illustrate examples of layers and packets;

FIG. 7 is a diagram to illustrate an example of a packet array of LRCP progression;

FIG. 12 is a diagram to illustrate an example of the approximate value of the visual weight of observation distance 1000 and the rank of packets;

FIG. 13 is a diagram to illustrate an example of the approximate value of the visual weight of observation distance 1700 and the rank of packets;

FIG. 14 is a diagram to illustrate an example of the approximate value of the visual weight of observation distance 3000 and the rank of packets;

FIG. 15 is a diagram to illustrate an example of the correspondence relation between the quality value and the rank of the packets to be selected;

FIG. 19 is a diagram to illustrate an example of the correspondence relation between the quality value and the visual weight selected;

FIG. 20 is a diagram to illustrate an example of the correspondence relation between the compression ratio of original codes, the quality value, and the visual weight selected;

FIG. 21 is a flowchart to illustrate the code processing method in another embodiment of the present invention;

FIG. 22 is a diagram to illustrate an example of the correspondence relation between the quality value and the layer selected;

FIG. 23 is a diagram to illustrate an example of the correspondence relation between the quality_rest value and the rank of packets selected;

FIG. 24A, FIG. 24B and FIG. 24C are diagrams to illustrate an example of the original codes;

DETAILED DESCRIPTION OF PREFERRED EMBODIMENTS

Figure 1:
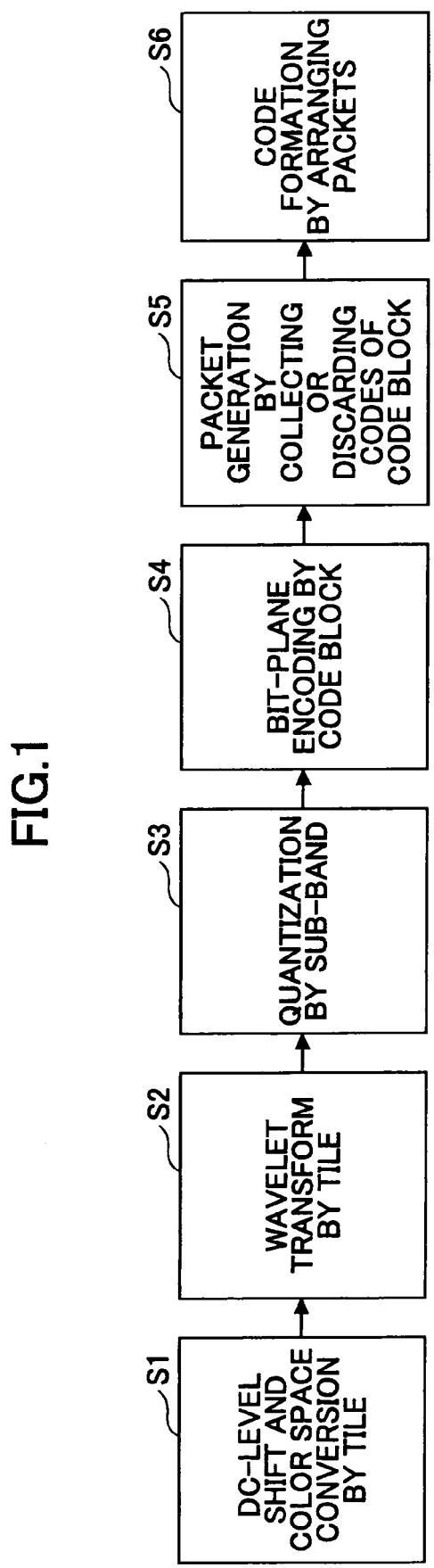
FIG. 1 is a block diagram to illustrate a simplified algorithm the code processing of JPEG2000.
Figure 2:
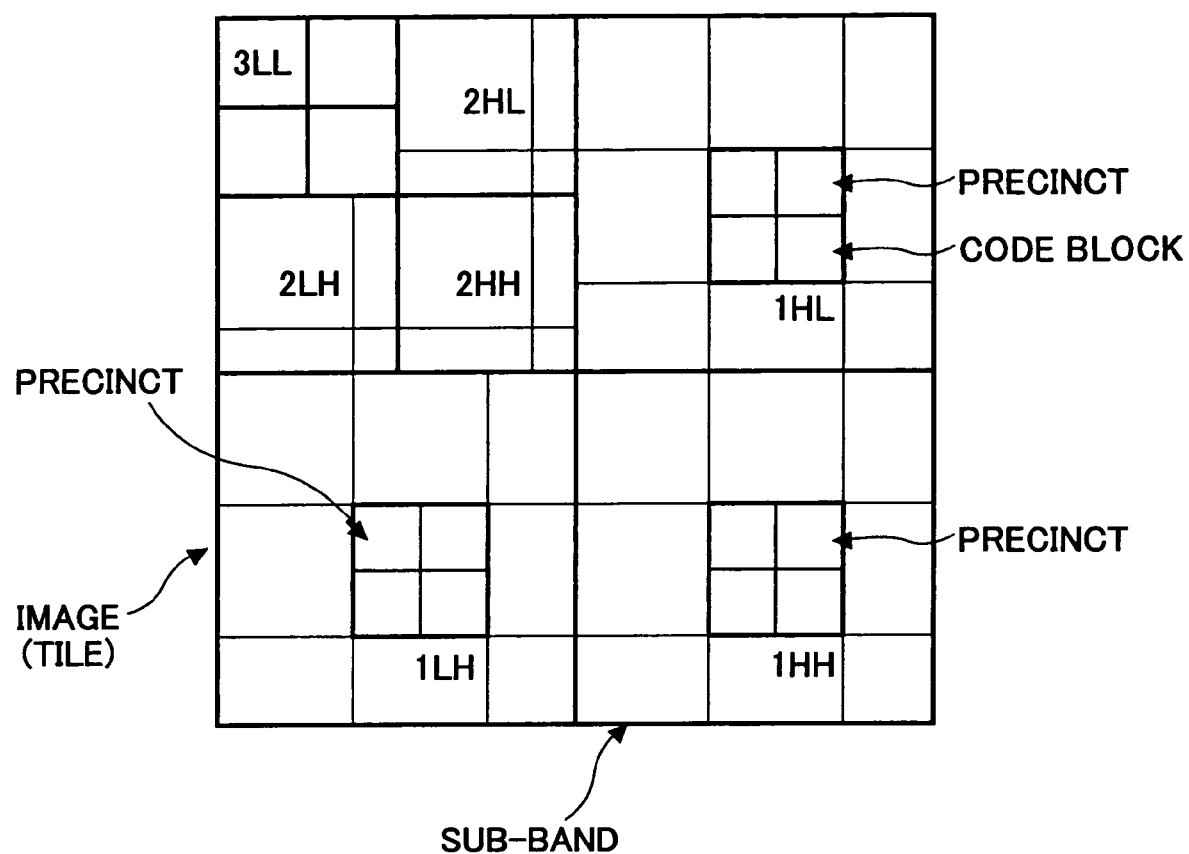
FIG. 2 is a diagram to illustrate the relation of an image, a tile, a subband, a precinct, and a code block.
Figure 3:
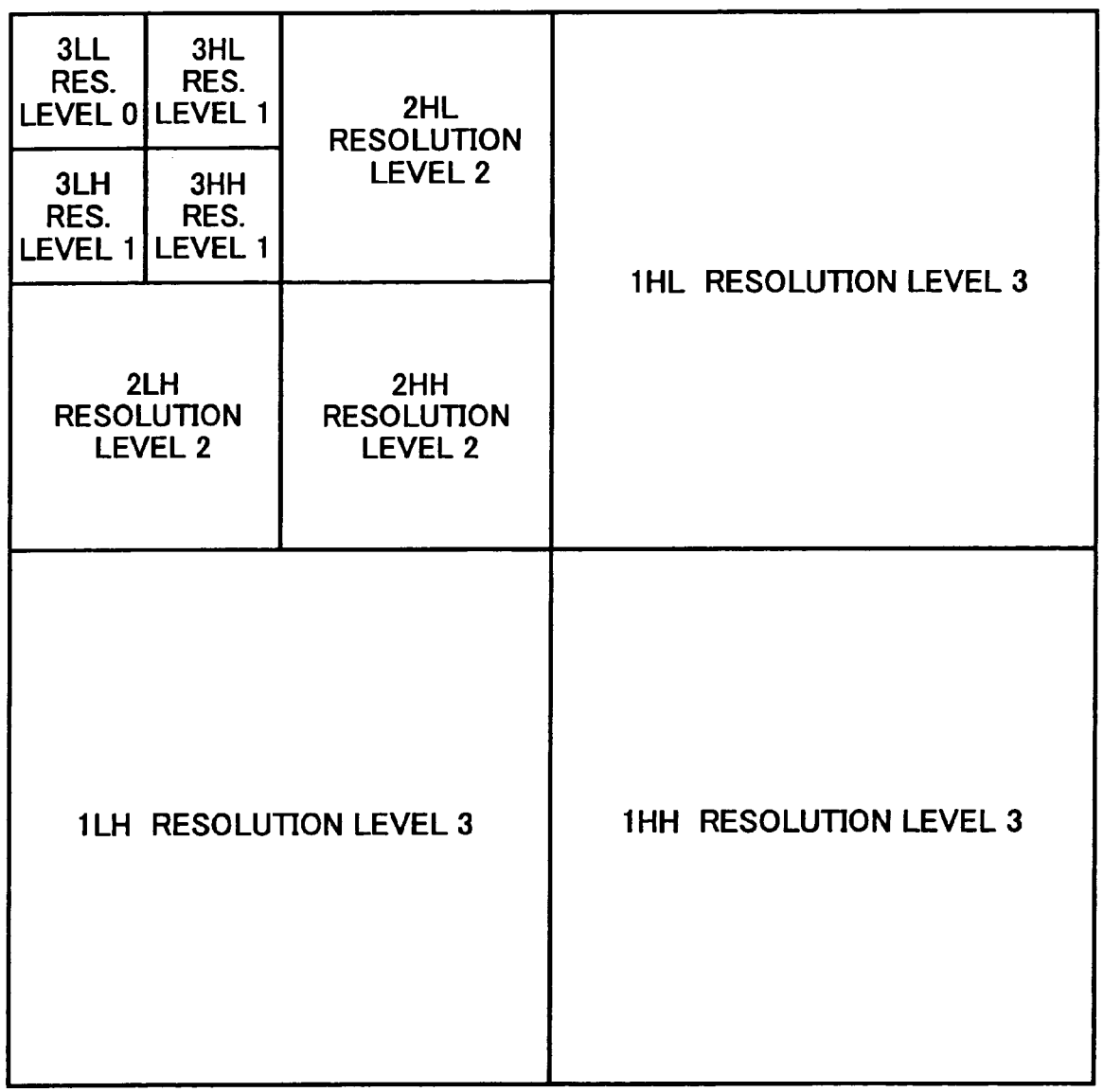
FIG. 3 is a diagram to illustrate the relation between decomposition level and resolution level.
Figure 5:
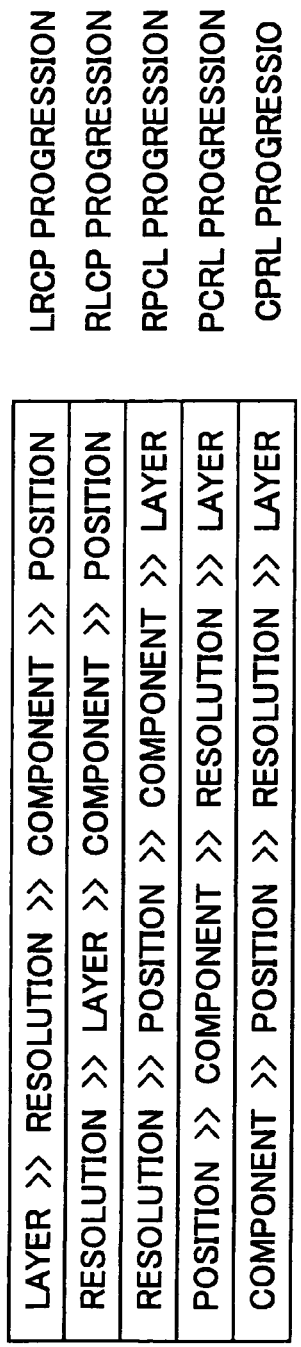
FIG. 5 is a diagram to illustrate the progression order of JPEG2000.
Figure 6:
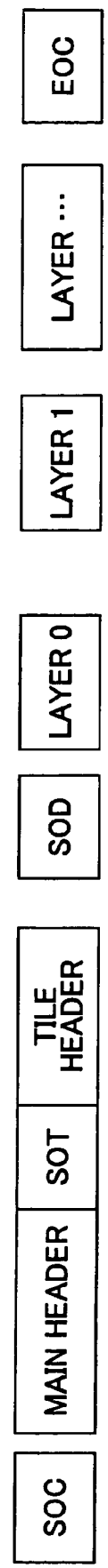
FIG. 6 is a diagram to illustrate the outline composition of layer progressive codes.

Embodiments of the present invention include an improved code processing device and method in which the above-described problems of JPIP are eliminated.

One embodiment of the present invention comprises a code processing device which generates, from original codes of JPEG2000 or sets of partial codes of the original codes with quality attributes and resolution attributes similar to the codes of JPEG2000, output codes having a quality according to a specified quality value with good accuracy.

Another embodiment of the present invention comprises a code processing method which generates, from original codes of JPEG2000 or sets of partial codes of the original codes with quality attributes and resolution attributes similar to the codes of JPEG2000, output codes having a quality according to a specified quality value with good accuracy.

In order to achieve the above-mentioned embodiments, a code processing device generates, from original codes having sets of partial codes with quality attributes and resolution attributes, output codes having a quality according to a specified quality value, where the code processing device comprises: a rank assignment unit to assign ranks to the sets of partial codes respectively, wherein, when the sets of partial codes have different quality levels, a high rank is assigned to a set of partial codes having a low quality level, and when the sets of partial codes have a same quality level and different resolution levels, a high rank is assigned to a set of partial codes having a low resolution level; a partial code selecting unit to select sets of partial codes from among the original codes, which have the quality according to the specified quality value and are included in the output codes, in order of the ranks assigned by the rank assignment unit; and a code forming unit to form the output codes in which the sets of partial codes selected by the partial code selecting unit are included.

In order to achieve the above-mentioned embodiments, a code processing method generates, from original codes of JPEG2000 having a plurality of components, output codes having a quality according to a specified quality value, where the code processing method comprises: selecting a visual weight according to a compression ratio or a quantization error of the original codes; assigning ranks to packets of respective layers among the original codes in order from a highest layer to a lowest layer based on the selected visual weight; selecting packets from the original codes, which have the quality according to the specified quality value and are included in the output codes, in order of the assigned ranks; and forming the output codes in which the selected packets are included.

According to the code processing device and method of the present invention, selection of partial codes from the original codes is controlled based on both the image attributes and the resolution attributes, and the output codes having the quality specified by a specified quality value can be generated with high accuracy.

A description will now be given of an embodiment of the present invention with reference to the accompanying drawings.

Figure 8:
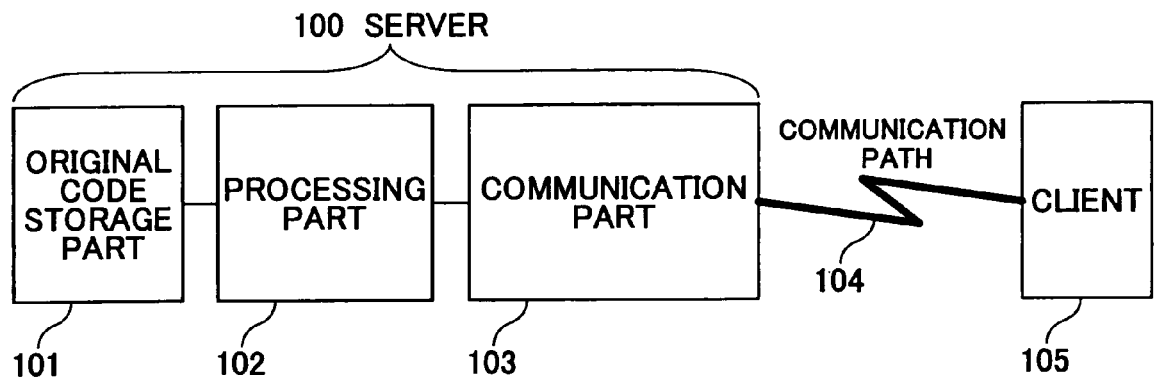
FIG. 8 is a block diagram to illustrate the composition of the code processing device in one embodiment of the present invention.

FIG. 8 is a block diagram showing the composition of the code processing device in an embodiment of the invention. In FIG. 8, reference numeral 100 denotes the code processing device of this embodiment which is a server. And the code processing device 100 is connected with the client 105 through the communication path 104 (which is, for example, the Internet, LAN, etc) so that a server client system is constituted.

That is, the code processing device 100 operates as a server of the server client system.

Alternatively, the code processing device 100 may also operate independently of the client 105.

The code processing device 100 includes an original code storage unit 101, a processing unit 102, and a communication unit 103.

The original code storage unit 101 stores the original codes (in this example, codes of JPEG2000). The processing unit 102 performs processing which generates the output codes of the quality of image according to a specified quality value from the original codes. The communication unit 103 performs communication processing which transmits the output codes to the client 105, and receives a transmission request (which includes specified codes, a specified image area, and a specified quality of image) from the client 105.

In the processing unit 102, respective units of the invention as claimed in the claims are included. The communication unit 103 is equivalent to the communication unit of the invention as claimed in the claims.

Figure 9:
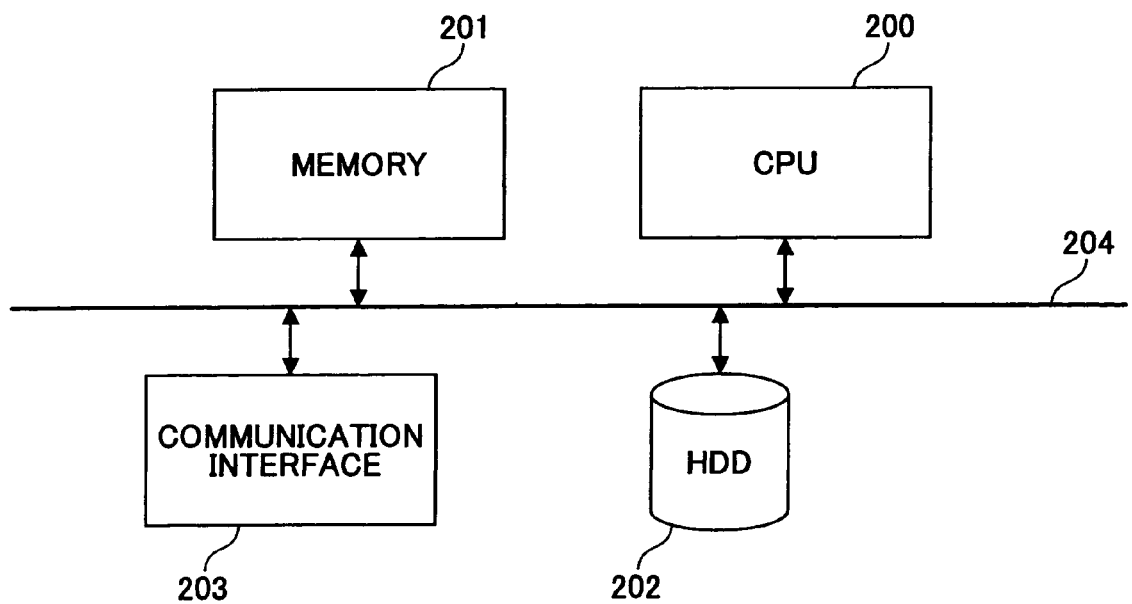
FIG. 9 is a block diagram to illustrate the composition of a computer in which the code processing device of the present invention is embodied.

The code processing device 100 may be realized by executing the program on the computer which is comprised of a CPU 200, a memory 201, a hard disk drive unit (HDD) 202, a communication interface 203, etc. which are interconnected by a bus 204 as shown in FIG. 9. That is, the computer is operated in accordance with one or more programs as the processing unit 102 and the communication unit 103.

The processing unit 102 may be configured to perform respective steps of the invention as claimed in the claims, and the respective steps are performed by executing one or more programs on the computer. The computer-readable recording medium in which the programs are recorded may be configured to cause the computer to perform the respective steps of the invention, which is also included in the invention. The programs described above are stored in the hard disk drive unit 202, for example. When the necessity arises, the programs from the hard disk drive unit 202 are loaded to the memory 201 and executed by the CPU 200. Thereby, the computer is operated as the code processing device 100. The hard disk drive unit 202 is also used as the original code storage unit 101.

The flow of processing when the code processing device 100 operates independently of the client 105 is as follows.

The original codes stored in the hard disk drive unit 202 are read into the memory 201 by the instruction from the CPU 200. The CPU 200 performs processing which reads the original codes from the memory 201 and generates the output codes, and writes the generated output codes in another area of the memory 201.

At this time, if needed, correcting the header information of the output codes, adding empty packets or assignment of ID information is performed. And the output codes from the memory 201 are recorded on the hard disk drive unit 202 by the instruction from the CPU 200.

The flow of processing when the code processing device 100 operates as the server is as follows. When the request for transmission of the codes is received from the client 105 via the communication interface 203, the original codes stored in the hard disk drive unit 202 are read into the memory 201 by instructions from the CPU 200. The CPU 200 performs the processing which reads the original codes of the memory 201 and generates the output codes, and records the generated output codes in another area of the memory 201.

At this time, if needed, correcting the header information of output codes, adding empty packets or assignment of ID information is performed. And the output codes from the memory 201 are transmitted to the client 105 through the communication interface 203 by the instruction from the CPU 200.

Next, the processing of the code processing device 100 in an embodiment of the present invention will be explained.

In the following, it is assumed that the code processing device 100 operates as a server, and the original codes are the codes of JPEG2000.

The outline of operation of the code processing device 100 of this embodiment will be explained using the flowchart of FIG. 10.

A transmission request is received from the client 105 (step S100). Specified codes, a specified image area, and a specified quality of image are included in the transmission request. The specified codes are to specify the image to which the requested codes belong. The specified image area is to specify which area of the image the requested codes belong. In this case, the whole area of the image shall be specified.

When the partial area of an image is specified, selection of packets which will be explained below only for the codes of precinct corresponding to the specified area is performed.

The specified quality of image is to specify what kind of quality of image to which the requested codes belong. In this case, the specified quality value (quality value) which can take any value in a range of 0 to 100 shall be specified.

In this embodiment, with respect to the packets of different layers (or different quality levels), rank assignment of the packets is performed such that a high rank is assigned to a set of partial codes (packet) having a low quality level (high rank layer). With respect to the packets of a same rank layer (or same quality level) having different resolution levels, rank assignment of the packets is performed such that a high rank is assigned to a set of partial codes (packet) having a low resolution level.

In this embodiment, in order to incorporate the visual frequency characteristic for every component into the rank assignment of packets, a visual weight (a quantity indicating the significance of the codes for every subband) which is specified by the JPEG2000 standard is used.

A visual weight is computed for every observation distance to an image. The visual weights of three observation distances (1000, 1700, and 3000) are illustrated in the standard document of JPEG2000 (these weights are specified for irreversible color transform ICT for 9×7 transform). It is also possible to divert to reversible color transform RCT for 5×3 transform by converting the weights suitably.

In this embodiment, which visual weight (which observation distance thereof) should be used for rank assignment is determined (step S101).

Next, rank assignment of the packets is performed based on the visual weight selected at the step S101 (step S102).

Next, the packets that should be included in the output codes having a quality indicated by the specified quality value are selected according to the rank (step S103).

Next, the output codes including the packets of the original codes selected at the step S103 are formed (step S104).

Finally, the formed output codes are transmitted to the client 105 together with the header information for communication. (step S105).

The operation of the step S101 will be explained. A small visual weight of observation distance should be applied to the sets of partial codes when the compression ratio and quantization error of the codes are small. A large visual weight of observation distance should be applied when the compression ratio and quantization error of the codes are large. It is experimentally confirmed that subjectivity quality of an image will improve in such a manner. If the quantization error of the original codes is small, the quantization error of the output codes including the partial packets of the original codes can also be relatively referred to as small.

Figures 10, 11:
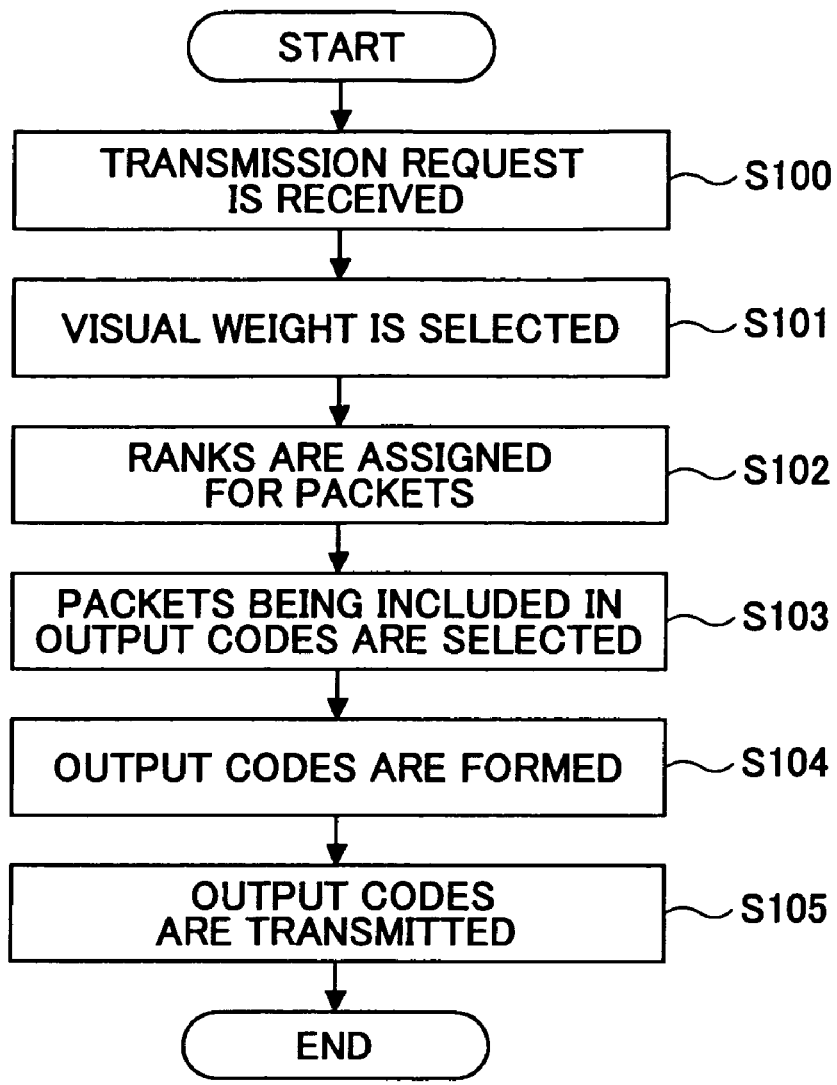
FIG. 10 is a flowchart to illustrate the code processing method in one embodiment of the present invention.
FIG. 11 is a diagram to illustrate an example of the correspondence relation between the compression ratio and the visual weight selected.

In this embodiment, the visual weight to be used is selected based on the correspondence relation between the compression ratio and the visual weight, as shown in FIG. 11, according to the compression ratio of the original codes.

Specifically, when the compression ratio of the original codes is less than 20, the visual weight of observation distance 1000 is selected, when the compression ratio is more than 20 and less than 40, the visual weight of observation distance 1700 is selected, and when the compression ratio is more than 40, the visual weight of observation distance 3000 is selected.

Alternatively, the visual weight may be selected according to the quantization error of the original codes, and such alternative embodiment is also included in the invention. How-ever, generally, the method of selecting the visual weight according to the compression ratio will be more advantageous, since the compression ratio can be easily read from the main header information of the original codes.

Assuming that the number of decomposition levels of the original codes is 2, the approximate values of the visual weights of observation distances 1000, 1700, and 3000 for every component are set to the values as shown in the left-hand columns of FIG. 12, FIG. 13, and FIG. 14, respectively.

Next, the operation of the step S102 will be explained. With respect to the visual weight of each component shown in the left-hand column of FIG. 12, there is only a small difference between the visual weights of LL subband in Y, Cb, and Cr. However, since the conditions of the visual weight: Y>Cr>Cb are satisfied as a whole with respect to the subbands other than LL as shown in the right-hand column of FIG. 12, with respect to the packets (resolution level 0) of LL subband, rank assignment of the packets is performed so that rank 1 is assigned for the packets of Y component, rank 2 is assigned for the packets of Cr component, and rank 3 is assigned for the packets of Cb component.

With respect to the packets having a resolution level higher than resolution level 1, rank assignment can be performed by the comparison using the average or maximum of the visual weights of HL, LH, and HH subbands which constitute the packets, or by the comparison using the average or maximum of the visual weights of HL and LH subbands only.

In this embodiment, the rank assignment for the visual weight of observation distance 1000 is performed by using the average of the visual weights of HL, LH, and HH subbands which constitute the packets, as shown in the right-hand column of FIG. 12. Similarly, the rank assignment for the visual weights of observation distances 1700 and 3000 is performed as shown in the right-hand columns of FIG. 13 and FIG. 14, respectively.

When the original codes include two or more layers, the rank assignment is performed by assigning ascending ranks for the packets from the high rank layer to the low rank layer one by one (or from the low quality side to the high quality side).

In the case of the original codes with packets having a resolution level of three or more, the visual weights for the decomposition level of three or more are also used for the rank assignment.

Next, the operation of the step S103 will be explained. Suppose the original codes of 1-layer composition having the decomposition level of 2 as shown in FIG. 16.

Figure 16:
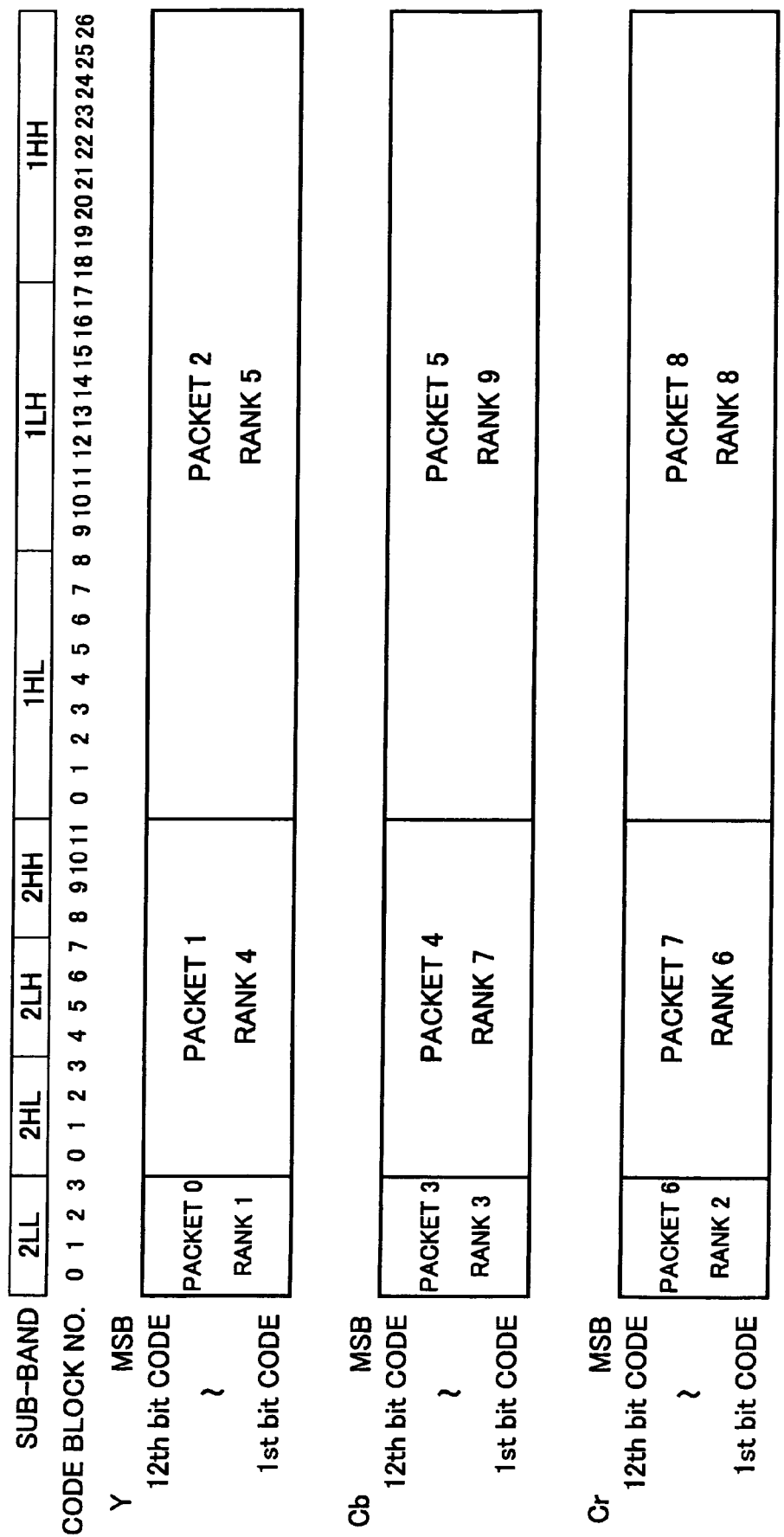
FIG. 16 is a diagram to illustrate an example of the original codes.

The original codes of FIG. 16 are generated as follows. The irreversible color transform is applied to RGB images, and three components of Y, Cb, and Cr are obtained. The 9×7 transform is applied to each component, and the codes are formed, after a slight linear quantization is performed, without performing truncation for all the bit planes. The original codes have a very small quantization error (the compression ratio is less than 20).

Figure 4:
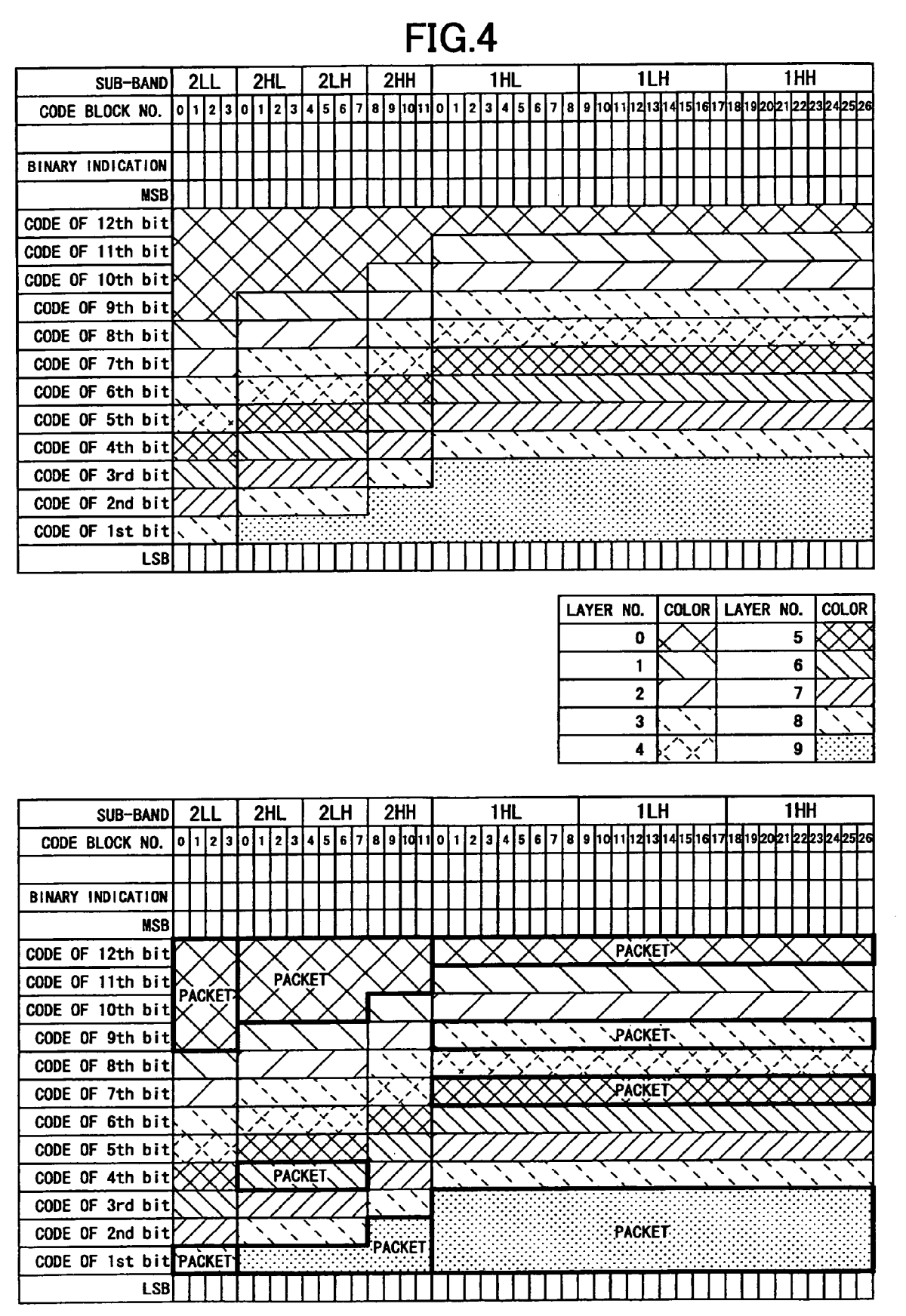

Similar to the example of FIG. 4, the condition: precinct size=subband size is met. In FIG. 16, the numbers of 0 to 8 are given to the packets respectively, for the sake of convenience of description.

In the step S103, the packets which should be included in the output codes having a quality according to the specified quality value are selected.

In this embodiment, the packets are selected according to the order of the assigned ranks based on the correspondence relation between the quality level and the rank of the packets to be selected as shown in FIG. 15.

The number of the packets selected increases when the quality value is large (or when the specified quality of image is high).

The relation of FIG. 15 is prepared by supposing the original codes of FIG. 16. If the decomposition level or the number of layers of the original codes differs, the correspondence relation between the quality value and the rank of the packets to be selected also differs.

Since the compression ratio is less than 20 in the present case of the original codes of FIG. 16, the visual weight of observation distance 1000 is selected at the step S101.

Therefore, the rank of each packet is as shown in FIG. 16 through the rank assignment processing of the step S102.

When the packets of each component are taken into account, a high rank is to a packet having a low resolution level. However, when comparison is made between the components, the rank assignment of the packets of the same resolution level is carried out in the order of Y, Cr, and Cb. For example, the rank of packet 2 of Y component having a high resolution level is higher than the ranks of packets 4 and 7 of Cb and Cr components having a low resolution level. This is because the visual frequency characteristic for every component is incorporated in the rank assignment.

Figure 17:
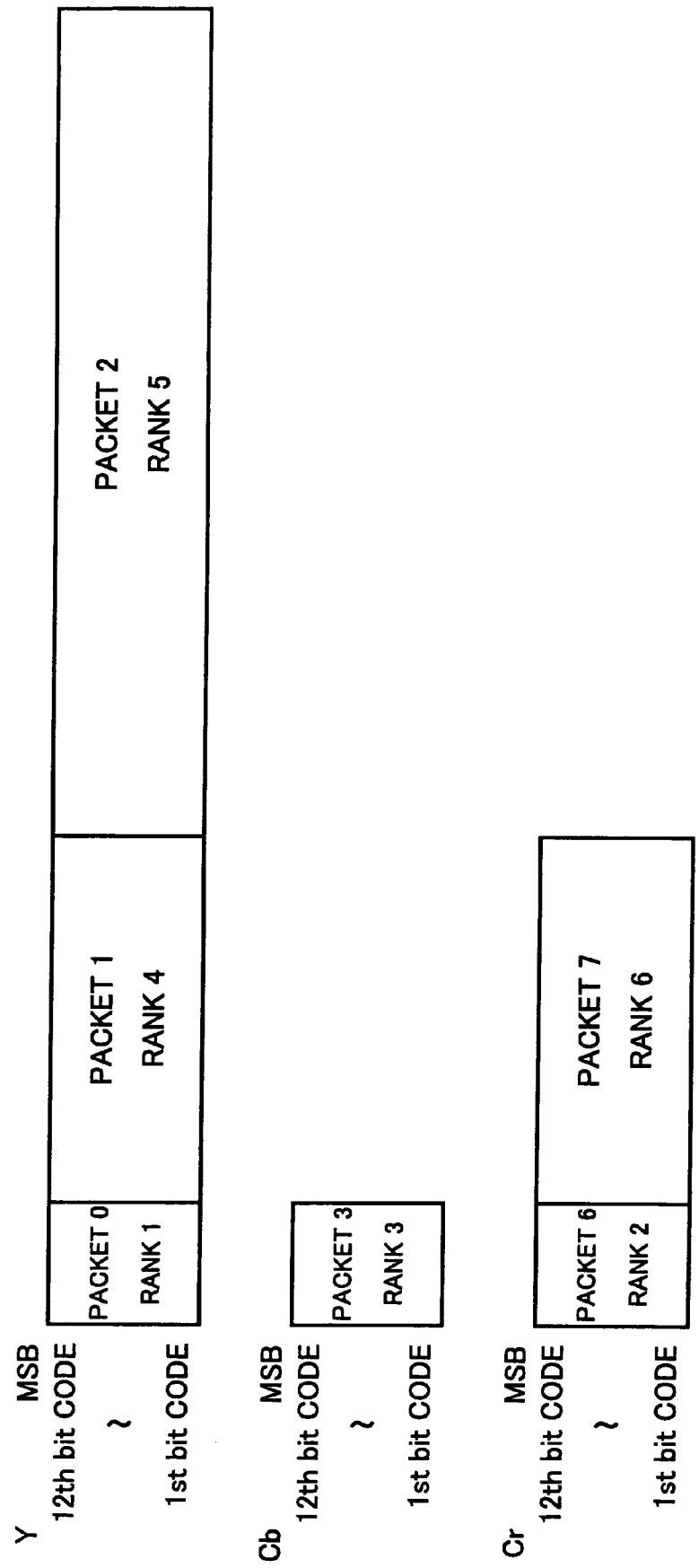
FIG. 17 is a diagram to illustrate an example of the packet selection.

When the quality value is 60, the packets of the ranks 1-6 are selected in accordance with the relation of FIG. 15. That is, in this example, the packets shown in FIG. 17 are selected at the step S103.

When the original codes comprise two or more layers, packets will be selected from the packets of the high rank layer (low quality side) in order of the assigned ranks.

Next, the operation of the step S104 will be explained. At the step S104, the output codes are formed from the packets selected at the step S103.

Figure 18:
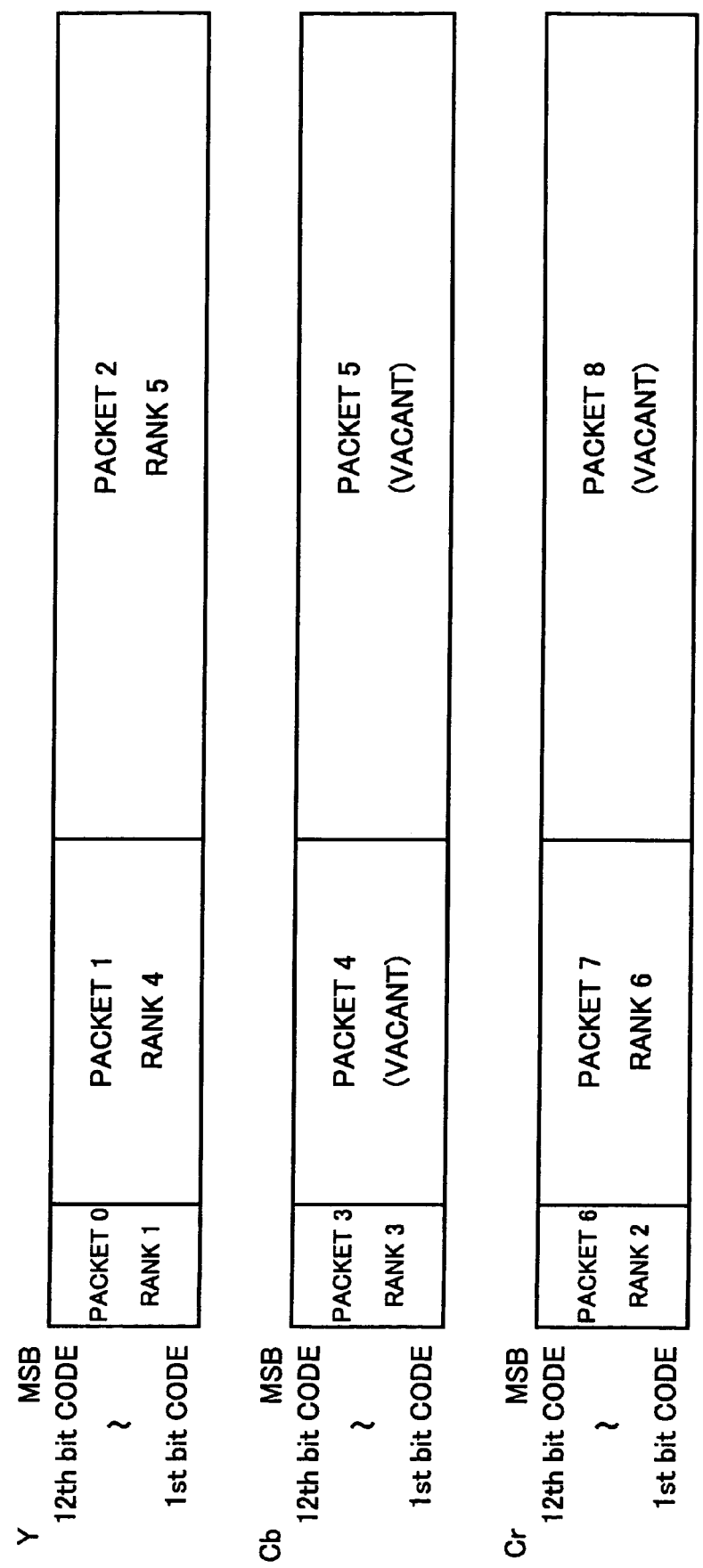
FIG. 18 is a diagram to illustrate an example of the output codes which are formed after packet selection.

When it is necessary to form the output codes in the form in conformity with the codes format of JPEG2000, empty packets (containing bits 0) are added to the positions where the packet is missing, and the marker (PLT marker) related to the packet size in the tile part header attached in advance of the packet is corrected. Usually, the main header of the codes itself can be used without change. For example, when the packets shown in FIG. 17 are selected, the empty packets (4, 5, and 8) are added as shown in FIG. 18.

It is not necessary to convert the output codes into the tile components (called also tile parts) in conformity with the codes format of JPEG2000. This is because there is also the situation of transmitting the output codes with ID information suitably given, not only the situation of transmitting the output codes in the conforming format in the case of JPIP. In such situation, in the step S104, any empty packet is not added but the ID for identifying the packet (precinct) concerned is assigned to the packet in the output codes.

Next, the operation of the code processing device 100 in another embodiment of the invention will be explained using the flowchart of FIG. 10.

In this embodiment, operation of step S101 differs from that in the previous embodiment. Operation of other steps is the same as that of the previous embodiment.

The code processing device 100 of this embodiment selects at step S101 a visual weight of observation distance according to the quality value which is determined in accordance with the correspondence relation between the quality value and the visual weight selected as shown in FIG. 19.

Namely, if the quality value is 34 or less, the visual weight of observation distance 3000 will be selected. If the quality value is in a range of 35-69, the visual weight of observation distance 1700 will be selected. If the quality value is 70 or more, the visual weight of observation distance 1000 will be selected.

Next, the operation of the code processing device 100 in another embodiment of the invention will be explained using the flowchart of FIG. 10. In this embodiment, operation of step S101 differs from that in the previously described embodiment. Operation of other steps is the same as that in the previously described embodiment.

The code processing device 100 of this embodiment selects at step S101 a visual weight of the observation distance according to the quality value and the compression ratio, which are determined in accordance with the correspondence relation between the compression ratio of original codes, the quality value, and the visual weight selected as shown in FIG. 20.

Alternatively, the compression ratio of the original codes in this embodiment may be replaced with a quantization error so that the operation of step S101 is carried out in the same manner, according to the present invention.

Next, the operation of the code processing device 100 in another embodiment of the invention will be explained using the flowchart of FIG. 21.

As shown in FIG. 21, a transmission request is received from the client 105 (step S200). Specification of codes, the specification of an area, and specification of the quality of image may be included in this transmission request.

The specified quality value (quality value) in which specification of an area shall specify the image whole region, and the specification of quality of image can take the value of the range of 0-100 shall be specified similar to the previous embodiments of FIG. 10.

Figure 24A:
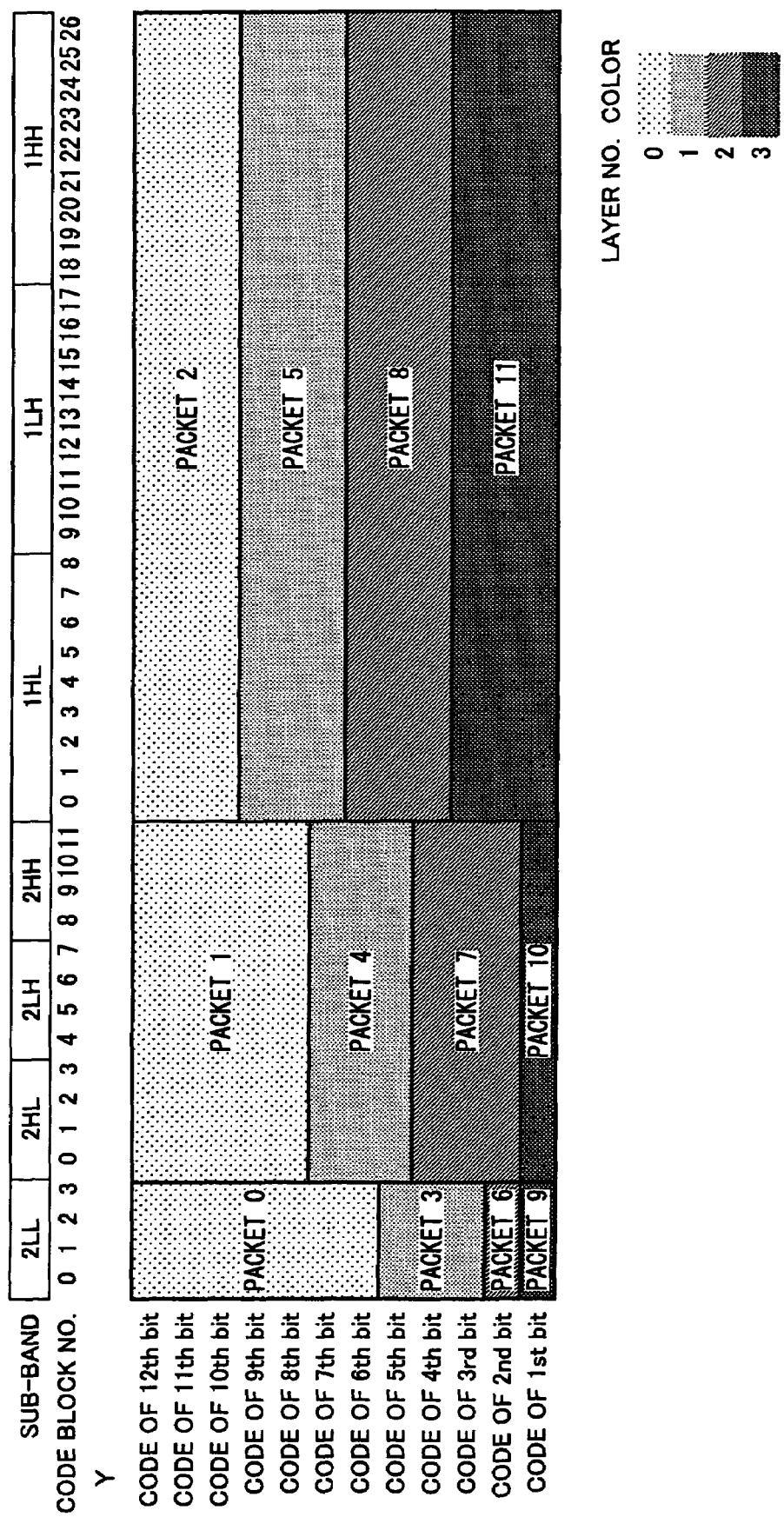
Figure 24B:
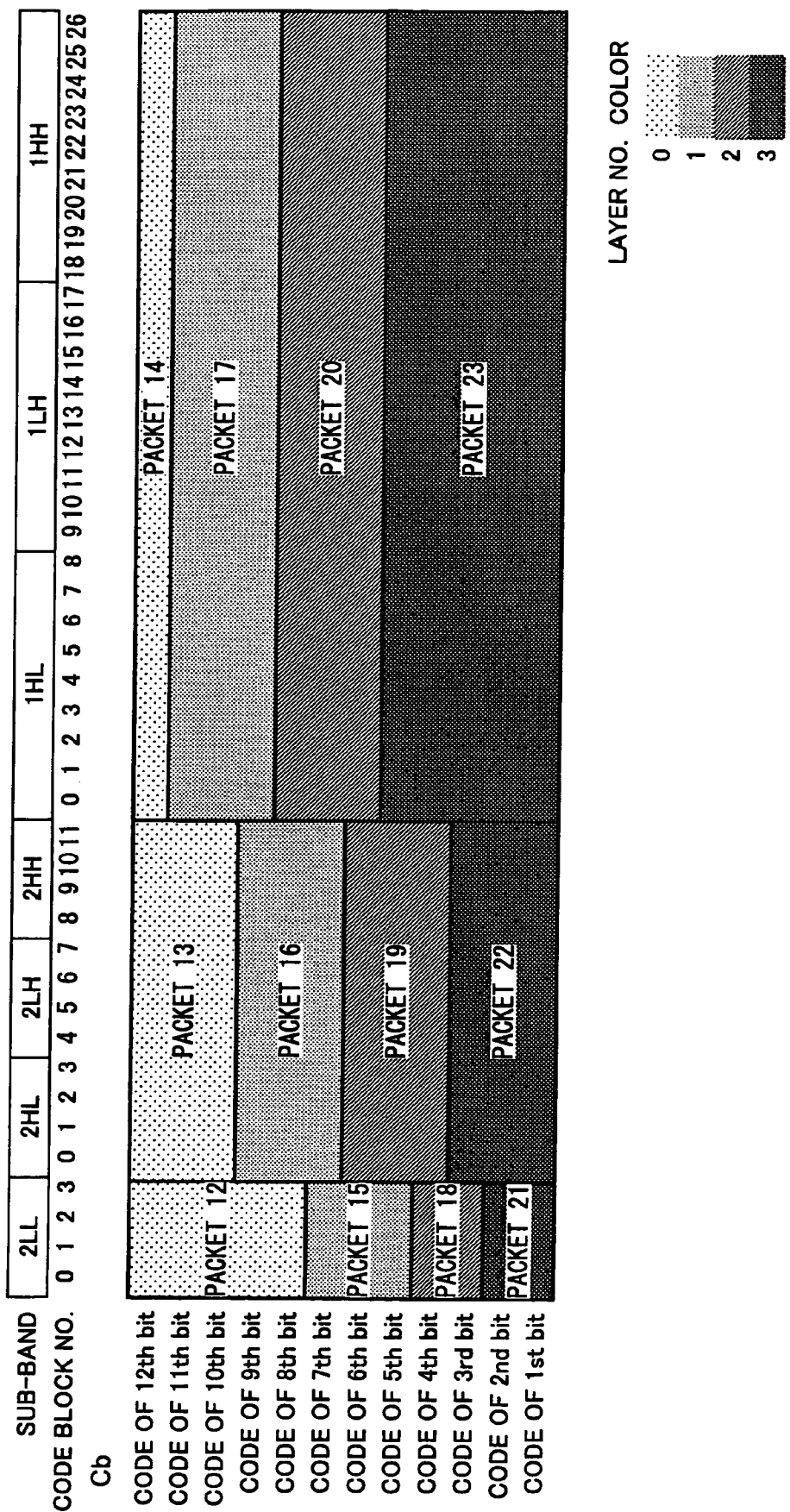

In this embodiment, suppose that the decomposition level is 2 and the original codes include 4 layers as shown in FIG. 24A to FIG. 24C.

In this embodiment, rank assignment of packets is not performed for all the layers, but rank assignment is performed only for the packets of the next high quality layer that is higher in the quality value than the specific layer determined according to the specified quality value, such that the visual frequency characteristic for every component is incorporated.

As shown in FIG. 21, specific layers are selected from among all the layers according to the quality value which is determined in accordance with the relation between the quality value and the layer selected shown in FIG. 22 (step S201). As shown in FIG. 22, if the quality value is in a range of 0-25, none of the layers is selected, if the quality value is in a range of 26-50, only layer 0 is selected.

The relation of FIG. 22 varies if the number of layers included in the original codes differs from that in this embodiment.

Next, the visual weight used for rank assignment is selected (step S202). In this embodiment, a visual weight of observation distance is selected according to the compression ratio of the original codes, which is determined in accordance with the relation shown in FIG. 11, similar to the previous embodiment of FIG. 10.

Alternatively, the compression ratio of the original codes in this embodiment may be replaced with a quantization error so that the operation of step S201 is carried out in the same manner, according to the present invention. Next, the rank assignment is performed, based on the visual weight selected at the step S202, only for the packets of the next high quality layer (which is the highest rank among the non-selected layers) that is higher in the quality than the specific layer selected at the step S201 (step S203).

For example, when the quality value equaling 60 is specified, the two layers 0 and 1 are selected according to the relation of FIG. 22, and the rank assignment is performed based on the selected visual weight for only the packets of the next high quality layer 2 that is higher in the quality than the selected layers 0 and 1.

Figure 25A:
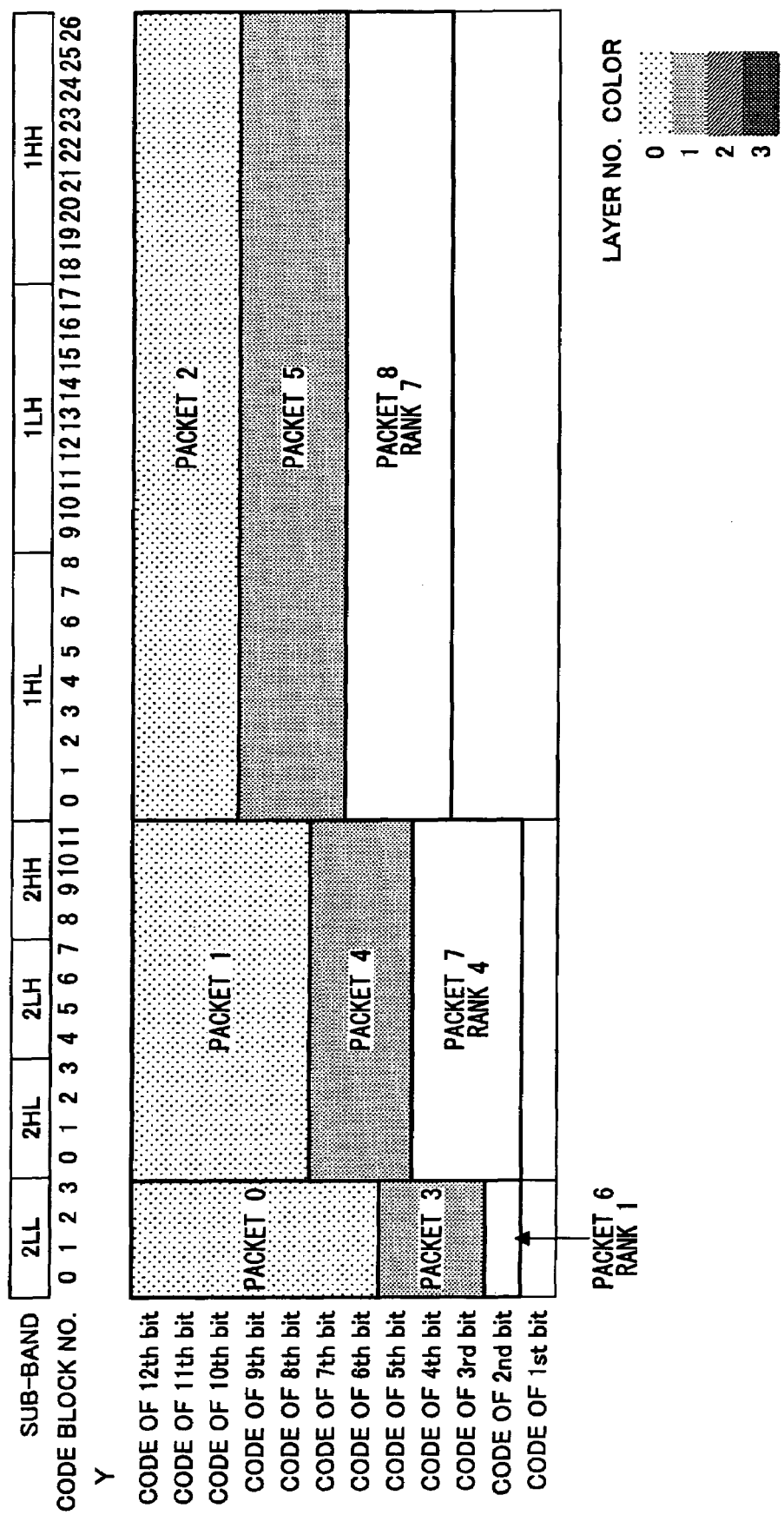
FIG. 25A, FIG. 25B and FIG. 25C are diagrams to illustrate an example of the rank assignment to the packets of layer 2 of the original codes of FIG. 24A to FIG. 24C.
Figure 25B:
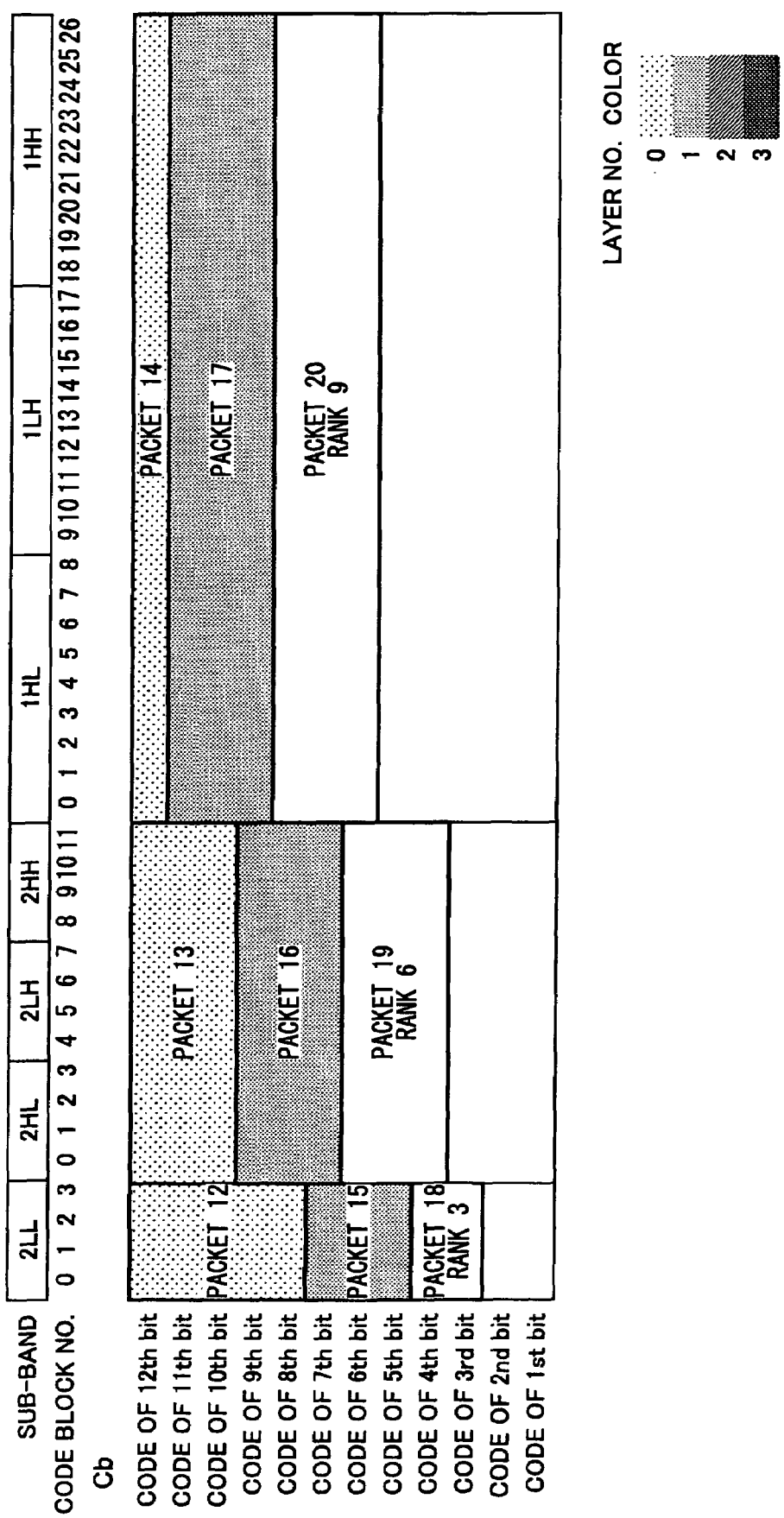
Figure 25C:
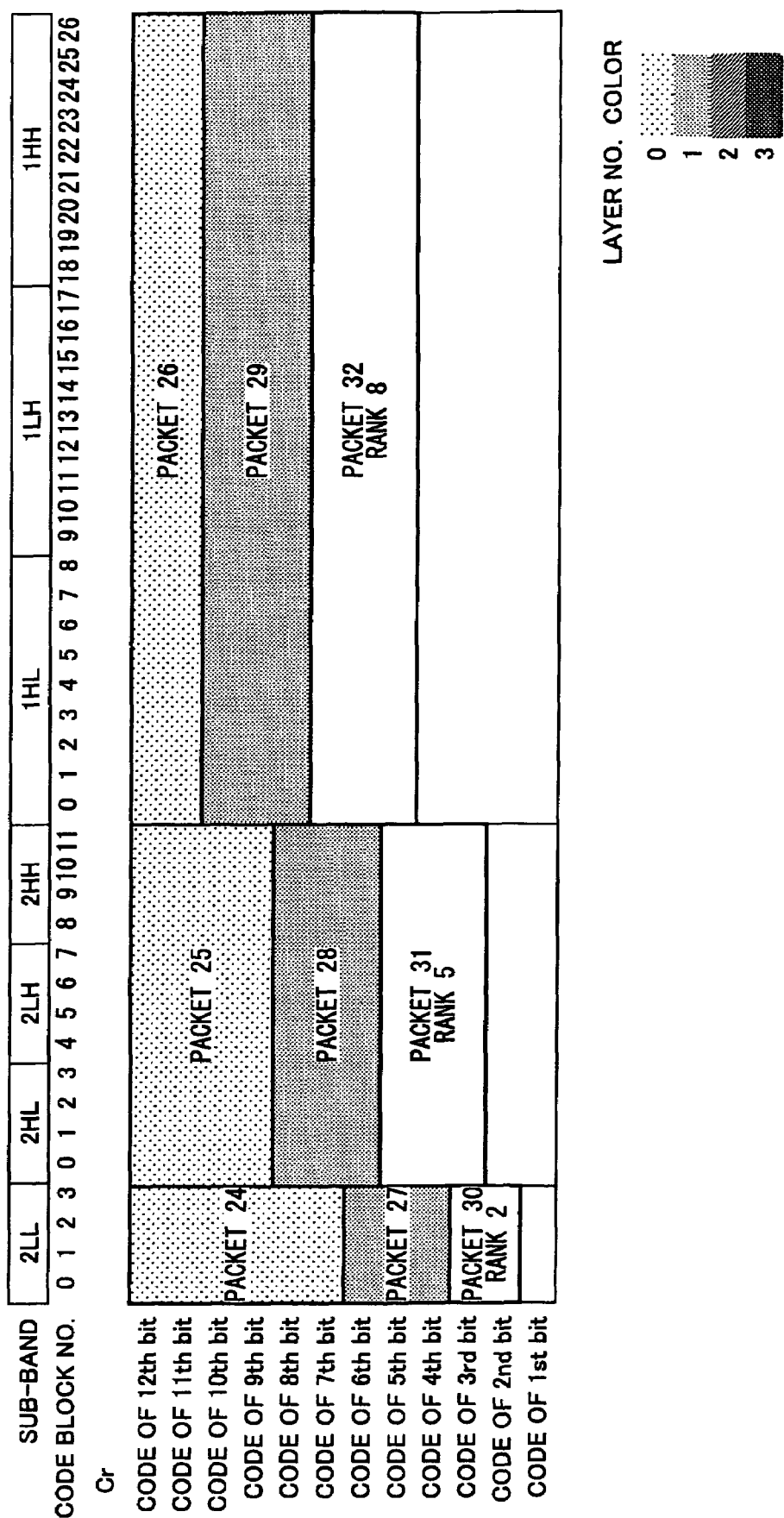

The results of this rank assignment are shown in FIG. 25A to FIG. 25C. After the rank assignment is completed, the packets which should be included in the output codes are selected (step S204).

At this step S204, all the packets of the layers which are selected at step S201 are initially selected. And only the packets in the necessary number in the sequence of the assigned ranks are selected from the packets of the next high quality layer that is higher in the quality than the specific layers selected at step S201.

In this embodiment, the difference (quality_rest) between the quality value specified and the lower limit of the quality range to which the quality value concerned belongs is computed in accordance with the formula: quality_rest=quality−int(quality/25)*25, and the packets up to the rank which is determined from the computed quality_rest value in accordance with the relation of FIG. 23 are selected.

For example, when the quality value is 60, the computed quality_rest value is 10, and only the packets of the ranks 1-4 are selected in accordance with the relation of FIG. 23.

Figure 26A:
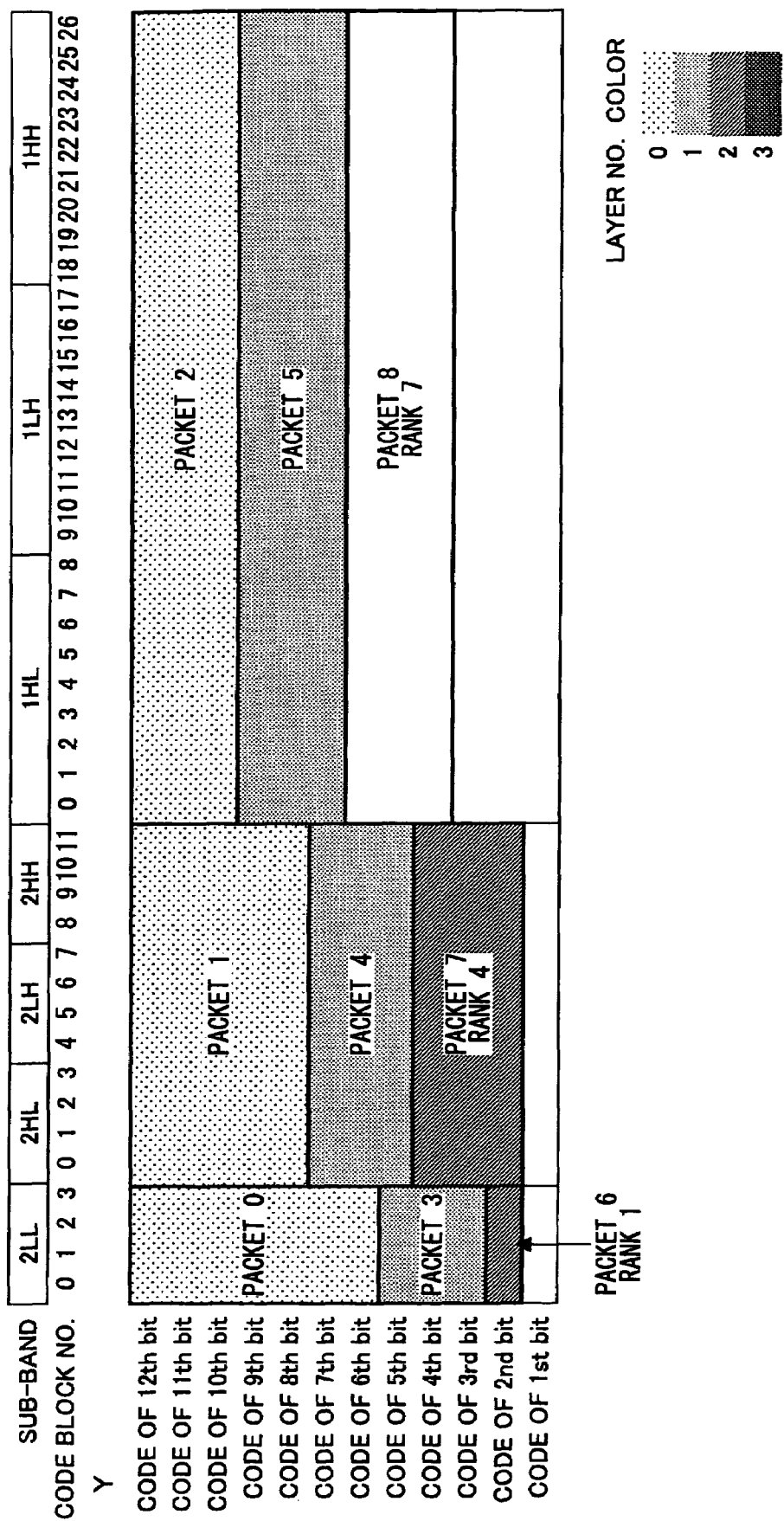
FIG. 26A, FIG. 26B and FIG. 26C are diagrams to illustrate an example of the packet selection of the original codes of FIG. 24A to FIG. 24C.
Figure 26B:
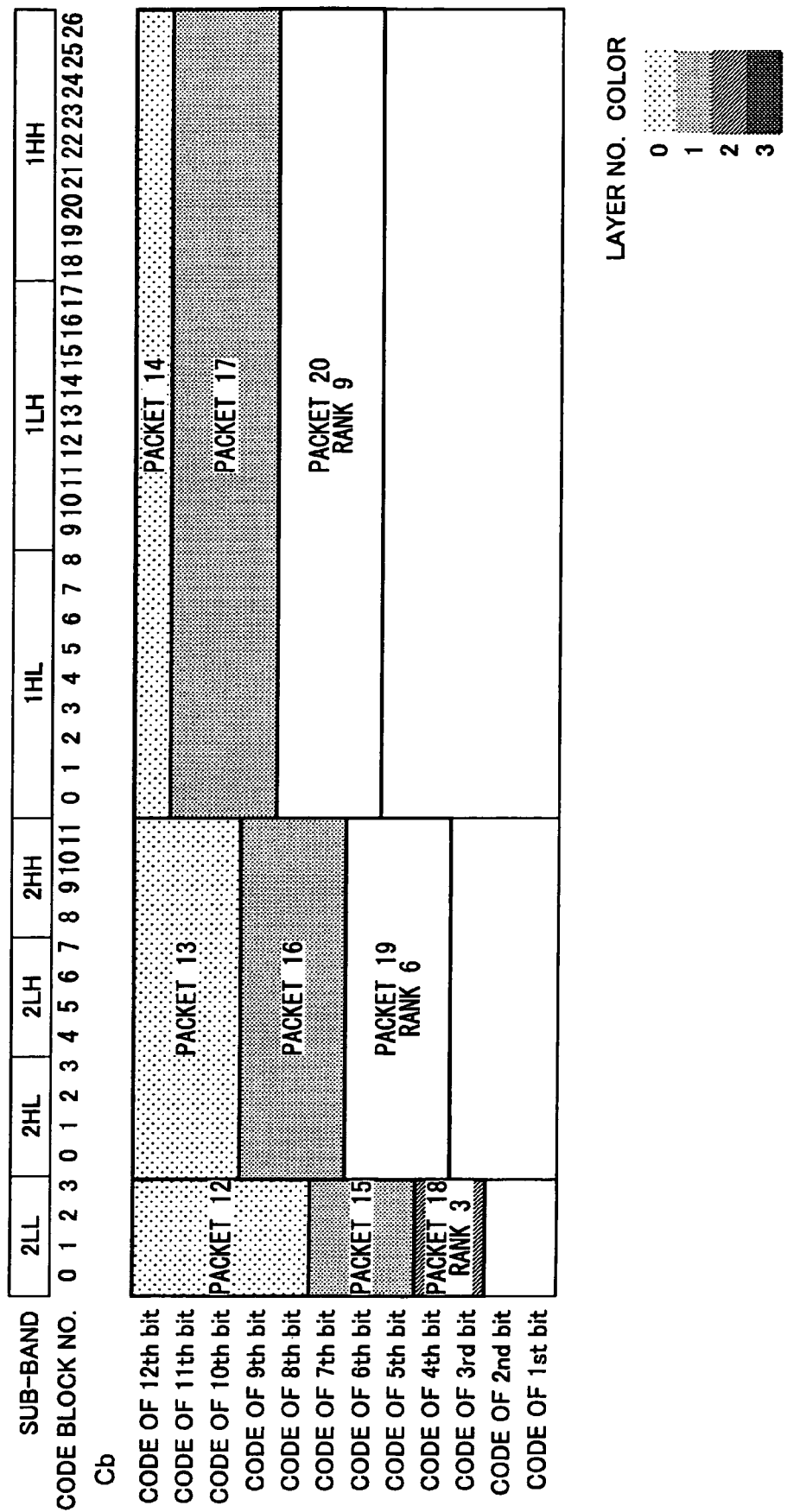
Figure 26C:
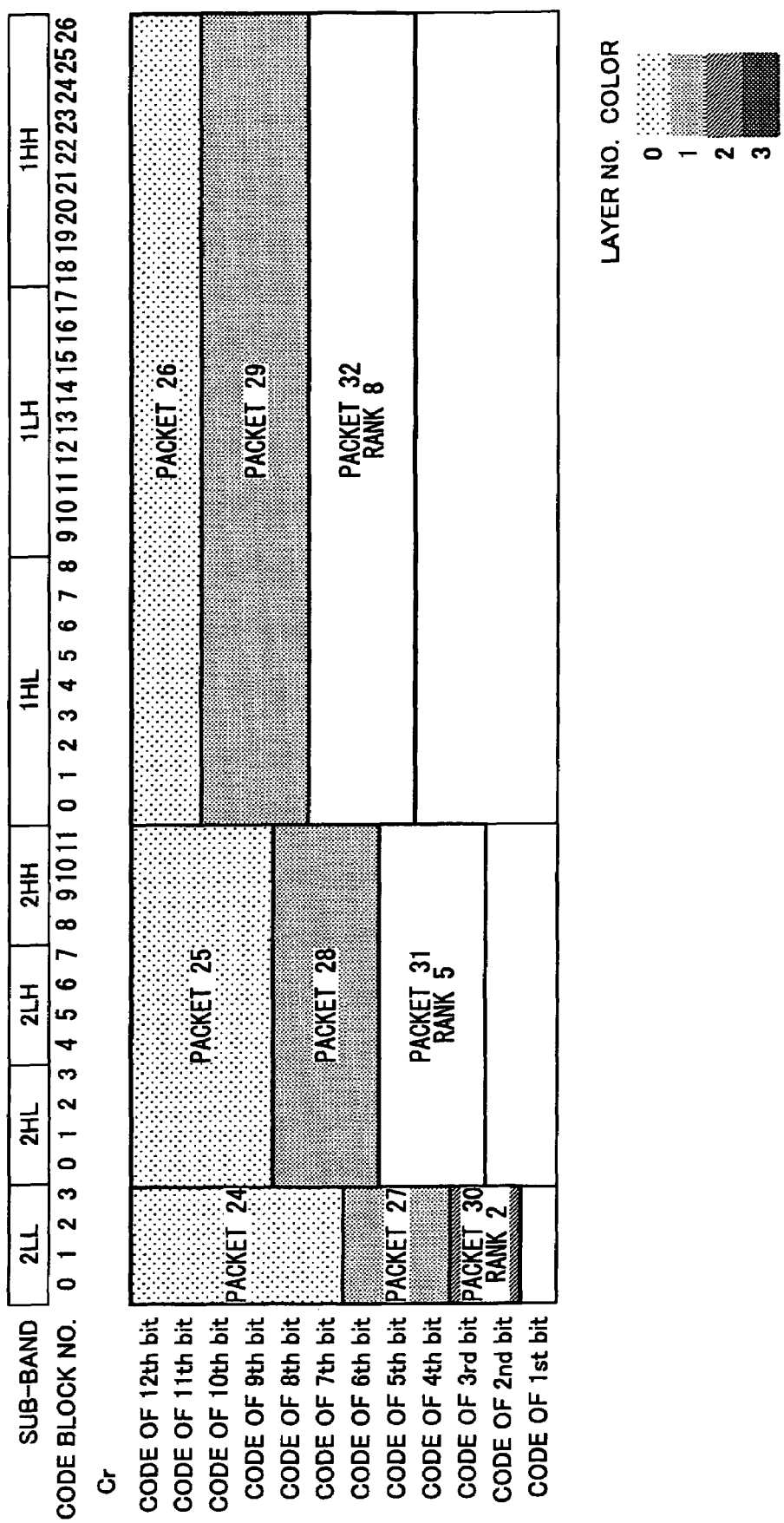

Consequently, in the case of quality value=60, all the packets of the layers 0 and 1, the packets 6 and 7 of the layer 2 (Y), the packet 18 of the layer 2 (Cb), and the packet 30 of the layer 2 (Cr) are selected as the packets which should be included in the output codes, as shown in FIG. 26A to FIG. 26C.

As mentioned above, in this embodiment, packets are selected per layer (quality unit) in the range that does not exceed the quality according to the specified quality value, and only the packets in the required number for obtaining the quality according to the specified quality value are selected from the packets of the following rank layers in the sequence of the assigned ranks.

Next, the output codes in which the packets selected from the original codes at the step S204 are included are formed (step S205).

The processing of the step S205 is the same as that of the step S104 in the previous embodiment of FIG. 10. Finally, the formed output codes with the header information for communication attached are transmitted to the client 105 (step S206).

Next, the operation of the code processing device 100 in another embodiment of the invention will be explained using the flowchart of FIG. 21. In this embodiment, operation of step S202 differs from that in the previous embodiment. Operation of other steps is the same as that in the previous embodiment.

The code processing device 100 of this embodiment selects at step S202 a visual weight of observation distance according to the quality value which is determined in accordance with the correspondence relation between the quality value and the visual weight selected shown in FIG. 19.

Next, the operation of the code processing device 100 in another embodiment of the invention will be explained using the flowchart of FIG. 21. In this embodiment, operation of step S202 differs from that of the step S101 in the previous embodiment of FIG. 10. Operation of other steps is the same as that in the previous embodiment of FIG. 21.

The code processing device 100 of this embodiment selects at step S202 a visual weight of observation distance according to the quality value and the compression ratio, which are determined in accordance with the correspondence relation between the compression ratio of the original codes, the quality value, and the visual weight selected shown in FIG. 20.

Alternatively, the compression ratio of the original codes in this embodiment may be replaced with a quantization error so that the operation of step S101 is carried out in the same manner, according to the present invention.

In the above-mentioned embodiments, the codes of JPEG2000 are used as the original codes. This is made to show a typical example of the original codes. Alternatively, if the original codes include a number of sets of partial codes with quality attributes and resolution attributes, such codes in any coding format other than the coding format of the codes of JPEG2000 may be used instead.

The present invention is not limited to the above-described embodiments, and variations and modifications may be made without departing from the scope of the present invention.

What is claimed is:

1. A code processing device which generates, from original codes having sets of partial codes with quality attributes and resolution attributes, output codes having a quality according to a specified quality value, the code processing device comprising:

a rank assignment unit to assign ranks to the sets of partial codes respectively, wherein, when the sets of partial codes have different quality levels, a high rank is assigned to a set of partial codes having a low quality level, and when the sets of partial codes have a same quality level and different resolution levels, a high rank is assigned to a set of partial codes having a low resolution level;

a partial code selecting unit to select sets of partial codes from among the original codes, which have the quality according to the specified quality value and are included in the output codes, in order of the ranks assigned by the rank assignment unit; and a code forming unit to form the output codes in which the sets of partial codes selected by the partial code selecting unit are included.

2. The code processing device according to claim 1 wherein the rank assignment unit is operable to incorporate, when the original codes comprise a plurality of components, a visual frequency characteristic of each component in the resolution attributes by which the ranks are assigned to the partial codes.

3. The code processing device according to claim 2 wherein the rank assignment unit is operable to change, according to a compression ratio or a quantization error of the original codes, the visual frequency characteristic of each component which is incorporated in the resolution attributes by which the ranks are assigned to the partial codes.

4. The code processing device according to claim 2 wherein the rank assignment unit is operable to change, according to the specified quality value, the visual frequency characteristic of each component which is incorporated in the resolution attributes by which the ranks are assigned to the partial codes.

5. The code processing device according to claim 2 wherein the rank assignment unit is operable to change, according to both the specified quality value and a compression ratio or a quantization error of the original codes, the visual frequency characteristic of each component which is incorporated in the resolution attributes by which the ranks are assigned to the partial codes.

6. The code processing device of claim 1 further comprising a communication unit which receives the specified quality value from an external device, and transmits the output codes formed by the code forming unit to the external device.

* * * * *